US006232569B1

(12) United States Patent
Nakajima et al.

(10) Patent No.: US 6,232,569 B1
(45) Date of Patent: May 15, 2001

(54) SWITCH CONTROL DEVICE

(75) Inventors: Nobuya Nakajima; Kyoichi Ohtsuka, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/543,009

(22) Filed: Apr. 4, 2000

(30) Foreign Application Priority Data

Jun. 4, 1999 (JP) .......... 11-157199
Oct. 27, 1999 (JP) .......... 11-304901

(51) Int. Cl.[7] .......... F16H 55/00; H01H 33/02
(52) U.S. Cl. .......... 200/400; 200/17 R; 218/154
(58) Field of Search .......... 200/17 R, 18, 200/400, 401, 500, 501; 218/84, 154

(56) References Cited

U.S. PATENT DOCUMENTS 4,163,133 * 7/1979 Bould .......... 200/153 SC
4,839,476 6/1989 Okuno .......... 200/17 R
5,224,590 * 7/1993 Milianowicz et al. .......... 200/400
5,901,838 * 5/1999 Nakatani et al. .......... 200/400

* cited by examiner

*Primary Examiner*—Michael Friedhofer
(74) *Attorney, Agent, or Firm*—Leydig, Voit & Mayer, Ltd.

(57) ABSTRACT

A switch control device includes a prestressing spring, a make-break contact, and at least one of a device for closing a circuit and a device for opening the circuit, wherein the device for closing the circuit includes a first elastic member, closing the make-break contact with a releasing force applied by the prestressing spring, and a second elastic member for aiding closing of the circuit and prestressed by the prestressing spring, and the device for opening the circuit includes a third elastic member for opening the circuit by opening the make-break contact with a releasing force and a fourth elastic member for aiding opening of the circuit, aiding the releasing force of the third elastic member.

4 Claims, 19 Drawing Sheets

SWITCH CONTROL DEVICE

BACKGROUND OF THE INVENTION

1. Field of the Invention

The present invention relates to a device for controlling a switch operated by a spring, for example, a breaker in a switching device for an electric power unit installed in a transforming station and a switchyard.

2. Discussion of Background

Generally, a spring is utilized as an origin of force for operating a control device of a breaker as a switch. FIGS. 14 through 19 illustrate a conventional spring controlling device of a breaker disclosed in, Japanese Unexamined Patent Publication No. JP-A-63-304542, wherein FIG. 14 is a perspective view, and FIG. 15 illustrates a structure of an important portion of the controlling device.

FIG. 16 illustrates a state of the spring controlling device in a state that the conventional breaker is opened. FIG. 17 illustrates a state of a torsion bar in a released state. FIG. 18 is a front view of the conventional breaker. FIG. 19 is a characteristic diagram illustrating a relationship between a displacement of a breaking control unit and a gas pressure in a cylinder in the conventional breaker.

In these figures, numerical reference 101 designates a casing; numerical reference 124 designates a cylinder fixed to the casing 101; and numerical references 26, 27 designate levers rotatably engaged with pins (not shown) located on an end surface of the casing 124.

Numerical reference 28 designates a torsion bar for opening a circuit, one end of which is fixed to the casing 101 and the other end thereof is fixed to the lever 26. Numerical reference 34 designates a torsion bar for opening the circuit, one end of which is fixed to the lever 26 and the other end thereof is fixed to a rotation shaft 32. Numerical reference 29 designates a torsion bar for closing the circuit, one end of which is fixed to the casing 101 and the other end thereof is fixed to a lever 27. Numerical reference 35 designates a torsion bar for closing the circuit, one end of which is fixed to the lever 27 and the other end thereof is fixed to a rotation shaft 33.

The conventional device will be described mainly in reference of FIG. 15. Numerical reference 37 designates a making lever fixed to the rotation shaft 33, which rotation shaft 33 is fixed to an end of the torsion bar 35 to give a rotational force in the counterclockwise direction by the torsion bars 29, 35 for closing the circuit as illustrated in FIG. 14. Numerical reference 2 designates a cam shaft supported by the casing 101; and numerical reference 3 designates a cam attached to the cam shaft 2. Numerical reference 13 designates a pin provided in the cam 3 for engaging a making latch; numerical reference 14 designates a making latch engaged with the pin 13 for engaging the making latch 13; and numerical reference 15 designates a making trigger engaged with the making latch 14. Numerical reference 16 designates a making electromagnet having a plunger 17.

Numerical reference 38 designates a rotation shaft supported by the casing 101, which rotation shaft is driven in the counterclockwise direction in FIG. 15 by a motor (not shown) Numerical reference 39 designates a pinion fixed to the rotating shaft 38; and numerical reference 40 designates a gear fixed to the cam shaft 2 so as to be engaged with the pinion 39, wherein teeth of the large gear are partially removed so as to be disengaged with the pinion 39 when the torsion bars 29, 35 for closing the circuit illustrated in FIG. 14 are prestressed. Numerical reference 41 designates a link for connecting the making lever 37 to the gear 40.

Numerical reference 36 designates a breaking lever fixed to the rotation shaft 32 connected to an end of the torsion bar 34 for opening the circuit formed to receive a rotational force in the counterclockwise direction by the torsion bars 28, 34 for opening the circuit illustrated in FIG. 14. Numerical reference 8 designates a releasing latch engaging pin provided in the breaking lever 36; and numerical reference 9 designates a roller provided in the breaking lever 36. Numerical reference 18 designates a releasing latch engaged with the releasing latch engaging pin 8.

Numerical reference 19 designates a releasing trigger engaged with the releasing latch 18. Numerical reference 20 designates a releasing electromagnet having a plunger 21. Numerical reference 22 designates a movable contact of the breaker, which contact is connected to the breaking lever 36 through a linkage mechanism 23 and a rod 61. The movable contact 22 and the rod 61 of the breaker will be described in detail in a latter part of this paragraph in reference of FIG. 18. Numerical reference 42 designates a buffer connected to the breaking lever 36 provided to relax an impact caused at a time of opening and closing the movable contact 22.

An operation of opening the circuit will be described. The breaking lever- 36 is constantly applied with a rotational force in the counterclockwise direction in FIG. 14 by the torsion bars 28, 34 for opening the circuit, which rotational force is retained by the releasing latch 18 and the releasing trigger 19. Under this state, when the releasing electromagnet 20 is excited, the plunger 21 is rightward moved to thereby release an engagement of the releasing latch 18 with the releasing trigger 19 by a clockwise rotation of the releasing trigger 19.

When the engagement between the releasing trigger 19 and the releasing latch 18 is released, the releasing latch 18 rotates in the counterclockwise direction by a counterforce received from the releasing latch engaging pin 8, whereby the releasing latch 18 is disengaged with the releasing latch engaging pin 8. The breaking lever 36 rotates in the counterclockwise direction to resultantly move the movable contact 22 in the direction of opening the circuit through a linkage mechanism 23 connected to the breaking lever 36. FIG. 16 illustrates a state after completing this operation of opening the circuit.

In the next, an operation of closing the circuit will be described. In FIG. 16, the cam 3 is connected to the making lever 37 through the cam shaft 2, the gear 40 fixed to the cam shaft 2, and the link 41, wherein the gear 40 and the cam 3 are applied with a rotational force in the clockwise direction by the torsion bars 29, 35 for closing the circuit. This rotational force is retained by the making latch 14 and the making trigger 15, which will be described in a latter part of this paragraph. Under this state illustrated in FIG. 16, when the making electromagnet 16 is excited, the plunger 17 is moved in the right direction; the making trigger 15 is rotated in the clockwise direction; and an engagement of the making latch 14 with the making trigger 15 is released.

When the engagement between the making trigger 15 and the making latch 14 is released, the making latch 14 rotates in the counterclockwise direction by a counterforce received from the making latch engaging pin 13. Therefore, the cam 3 rotates in the clockwise direction by a releasing force of the torsion bars 29, 35 for closing the circuit. Because an end portion of the cam 3 lifts the roller 9 located in the breaking lever 36, the breaking lever 36 is moved in the clockwise direction, i.e. an arrow A in FIG. 23 while twisting the torsion bars 28, 34 for opening the circuit, whereby the torsion bars 28, 34 for opening the circuit are prestressed.

When the breaking lever 36 is rotated to arrive a predetermined position, the releasing latch engaging pin 8 is engaged with and held by the releasing latch 18. The operation of closing the circuit is completed under a state illustrated in FIG. 17. As illustrated in FIG. 17, just after completing the operation of closing the circuit, the torsion bars 29, 35 are released. Because the torsion bars 28, 34 for opening the circuit are prestressed by releasing the torsion bars 29, 35 for closing the circuit, a prestressed energy of the torsion bars 29, 35 for closing the circuit is made larger than an energy required for prestressing the torsion bars 28, 34 for opening the circuit.

An operation of prestressing the torsion bars 29, 35 for closing the circuit will be described in reference of FIG. 17. By driving the pinion 39 in the counterclockwise direction in FIG. 17 by a motor (not shown), the gear 40 is rotated in the clockwise direction; the rotation shaft 33 is rotated in the clockwise direction via the link 41 and the making lever 37, whereby the torsion bars 29, 35 are prestressed.

The cam shaft 2 is applied with a rotational force in the clockwise direction by a force of releasing the torsion bars 29. 35 for closing the circuit through the link 41 at a position after a dead point where a direction of pulling the link 41 overlaps a center of the cam shaft 2. Simultaneously, because teeth of the large gear 40 are partially removed, an engagement between the pinion 39 and the gear 40 are disengaged, and the cam coaxially fixed to the large gear 40 rotates in the clockwise direction.

Thus, when the cam 3 rotates to arrive a predetermined position, the making latch engaging pin 13 is engaged with the making latch 14; a rotational force of the gear 40 in the clockwise direction applied by the torsion bars 29, 35 for closing the circuit is retained, whereby an operation of prestressing is completed. Consequently, the torsion bars 28, 34 for opening the circuit and the torsion bars 29, 35 for closing the circuit are returned again to the prestressed state illustrated in FIG. 15.

In the next, the breaker itself will be described. FIG. 18 is a front view of the breaker. The linkage mechanism 23 includes a lever 60, a link 62, a supporting plate 63, and a rotation shaft 88. The rotation shaft 88 is rotatably supported by the supporting plate 63; and the lever 60 is fixed to the rotation shaft 88 so as to rotate along with the rotation shaft 88. Another rotatable lever fixed to the rotation shaft 88 is connected to the link 62 via a pin.

The casing 101 of the device for controlling spring is fastened to the supporting plate 63, which is fastened to a right cover 64*a* of a pressure vessel 64. The breaking lever 36 of the spring controlling device is connected to the lever 60 fixed to the rotating shaft 88 via the rod 61. A high pressure gas 72 for electrically insulating is encapsulated in the pressure vessel 64. The pressure gas is for example a sulfurhexafluoride. Numerical reference 68 designate supporting tables fixed to the pressure vessel 64; numerical reference 67 designates a piston fixed to the supporting table 68 located in the right side; and numerical reference 71 designates a cylinder.

The movable contact 22 has a movable contact 22*a*, moved by the spring controlling device, and a nozzle 22*b*. Numerical reference 70 designates a fixed contact supported by the supporting plate 68 located in the left. A breaking control unit 69 includes the movable contact 22 and the cylinder 71, which breaking control unit 69 is connected to the breaking lever 36 of the spring controlling device via an insulating rod 66, a shaft 65, the linkage mechanism 23 and the rod 61 so as to be moved.

When the breaker is closed, the movable contact 22*a*, the nozzle 22*b*, and the fixed contact 70 are in contact. The movable contact 22 and the fixed contact 70 are a make break contact in a gas according to the present invention.

In a process that the breaker is opened, the breaking control unit 69, specifically the movable contact 22 and the cylinder 71 linearly move in the right direction in FIG. 18 at a high rate, whereby a pressure of the cylinder 71 becomes several times as high as that in a steady state. This high pressure gas generates a high speed gas flow toward an arc generated between the nozzle 22*b* and the fixed contact 70 when the breaking control unit 69 is released from the fixed contact 70 to thereby cool the arc and suppress the ark with a large current.

In this process, the high pressure in the cylinder 71 works as a counterforce against a movement of the breaking control unit 69, i.e. releasing force generated by the torsion bars 28, 34 for opening the circuit in the spring controlling device. FIG. 19 is a graph for showing a relationship between a displacement of the breaking control unit 69 with respect to a lapse of time and a gas pressure in the cylinder 71 in the conventional technique, wherein a solid line Pa designates the pressure in the cylinder 71; and a solid line S designates the displacement of the movable contact 22. Further, dotted lines Pa2, S2 respectively designate the gas pressure in the cylinder 71 and the displacement of the movable contact 22 when it is presumed that the counterforce is small.

Because, in actuality, the counterforce is large, even though it is required to quickly cut the arc by increasing the gas pressure in the cylinder 71 of the breaking control unit 69 at a latter stage of the displacement of the movable contact 22 as the dotted line Pa2, the counterforce against the driving force of the spring controlling device becomes large and the gas pressure cannot be increased, whereby a sufficient gas flow can not be secured as a solid line Pa.

When the conventional device for controlling spring is applied with a large electric power, it is necessary to increase releasing force by increasing an angle of twist of a torsion bar. Because there is an upper limit of strength in the angle of twist, it is necessary to extend the torsion bar. Further, because a load applied to constitutional components is increased when the electric power is increased, whereby it is also necessary to make the components large for assuring the strength. Thus, when the device for controlling spring deals with a high electric power, there is a problem that the weight of movable portions is increased and an entire spring controlling device became large.

When the spring controlling device deals with a high electric power, it is necessary to increase the force of spring of a torsion bar and therefore a load applied to the casing 101 and the cylinder 124 is increased. Therefore, if the rigidity of the casing is insufficient, the casing is deformed and a distance between the components is changed, whereby the device does not normally operate. As a countermeasure, it is necessary to increase the strength of the casing, whereby there are problems that the casing becomes large and the weight thereof is increased.

Further, because a rotational force of the torsion bars 28, 34 for opening the circuit in the conventional spring controlling device is decreased as a linear function with respect to a rotational angle of the breaking lever 36, force applied to the movable contact 22 decreases in accordance with a change approximate to the linear function. Accordingly, when the pressure in the cylinder 71 of the breaking control unit 69 is increased in a latter stage of the displacement of the movable contact 22, the rotational force of the torsion bars 28, 34 for opening the circuit unfavorably decrease. Therefore, there are problems that a gas flow sufficient for cooling the arc is not produced by increasing the pressure in the cylinder 71 at a time of breaking and a performance of breaking is restricted.

SUMMARY OF THE INVENTION

It is an object of the present invention to solve the above-mentioned problems inherent in the conventional technique and to provide a spring controlling device in a switch which can reduce the size of the device even though the spring controlling device deals with a high electric power and of which capability of breaking is increased.

According to a first aspect of the present invention, there is provided a switch controlling device comprising at least one of a device for opening a circuit and a device for closing the circuit, wherein the device for closing the circuit includes an elastic member for closing the circuit, which is prestressed by a prestressing means and closes a make break contact by releasing force, and an elastic member for aiding to close the circuit, which is prestressed by the prestressing means in association with prestressing of the elastic member for closing the circuit and aids the releasing force of the elastic member for closing the circuit in association with releasing of the elastic member for closing the circuit, and the device for opening the circuit includes an elastic member for opening the circuit, which opens the make break contact by releasing force, and an elastic member for aiding to open the circuit, which aids the releasing force of the elastic member for opening the circuit in association with the releasing of the elastic member for opening the circuit.

Because the releasing force for opening the make break contact is generated by the elastic members for opening the circuit and for aiding to open the circuit and/or the releasing force for closing the make break contact is generated by the elastic members for closing the circuit and for aiding to close the circuit, it is possible to prevent sizes of the elastic members from being large when the releasing force is increased to deal with a high output and therefore it is possible to restrict a size of the device itself.

According to a second aspect of the present invention, the device for closing the circuit includes an interlocking cam for making prestressing and releasing of the elastic member for closing the circuit with prestressing and releasing of the elastic member for aiding to close the circuit. The device for opening the circuit includes an interlocking cam for making releasing of the elastic member for opening the circuit with releasing of the elastic member for aiding to open the circuit.

By changing a shape of the interlocking cam for closing the circuit, it is possible to control a load applied to the prestressing means when the elastic member for aiding to close the circuit is prestressed. Further, by changing a shape of the interlocking cam for opening the circuit, it is possible to control releasing force aided by the elastic member for aiding to open the circuit, whereby a characteristic of opening the circuit in the make break contact, which is opened by the releasing force, can be changed.

According to a third aspect of the present invention, the interlocking cam for closing the circuit is so shaped that a maximum value of the load applied to the prestressing means at time of prestressing the elastic members for closing the circuit and for aiding to close the circuit becomes substantially flat.

By substantially making the maximum value of the load applied to the prestressing means at time of prestressing, it is possible to control a maximum load at time of prestressing and to miniaturize the prestressing device.

According to a fourth aspect of the present invention, there is provided a switch controlling device including both of a device for closing a circuit and a device for opening the circuit, wherein the device for closing the circuit prestresses elastic members for opening the circuit and for aiding to open the circuit by releasing force of elastic members for closing the circuit and for aiding to close the circuit.

Because the elastic members for opening the circuit and for aiding to open the circuit are prestressed by the releasing force of the elastic members for closing the circuit and for aiding to close the circuit, it is possible to reduce the number of constitutional components in comparison with a case that the elastic members for opening the circuit and for aiding to open the circuit are separately prestressed, whereby a structure is simplified.

According to a fifth aspect of the present invention, the elastic members are torsion bars, the elastic member for closing the circuit and the elastic member for aiding to close the circuit are commonly supported by a supporting member for closing the circuit and have adverse twisting directions at time of prestressing these, and the elastic member for opening the circuit and the elastic member for aiding to open the circuit are commonly supported by a supporting member for opening the circuit and have adverse twisting directions at time of prestressing these.

Because the twisting directions of the torsion bars are adverse, it is possible to offset or reduce rotational force of the elastic members respectively applied to the supporting members for closing the circuit and for opening the circuit. Accordingly, even in a case that the releasing force of the torsion bars is increased, it is not necessary to reinforce the rigidities of the supporting members, whereby the size and the weight of the switch controlling device are not increased.

According to a sixth aspect of the present invention, a switch is a gas-blast circuit-breaker or a load switch, the make and break contact is located in an electrically insulating gas, the electrically insulating gas is blown to the switch at time of opening the circuit by a cylinder actuated by the releasing force of the elastic members for opening the circuit and for aiding to open the circuit, and the releasing force by the elastic members for opening the circuit and for aiding to open the circuit becomes maximum at time of starting to release and has a local maximum value at time of blowing the electrically insulating gas.

By changing a shape of the interlocking cam for opening the circuit, it is possible to control the releasing force aided by the torsion bar for aiding to open the circuit, whereby the releasing force of the torsion bars for opening the circuit and for aiding to open the circuit becomes maximum at time of starting to release and has the local maximum value at time of blowing the electrically insulating gas. Because by the releasing force, the make break contact is opened and simultaneously the cylinder is actuated, it is possible to make a rate of opening the make break contact, and the electrically insulating gas is strongly blown by the cylinder, whereby a capability of breaking is improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6(*b*) is a graph showing characteristics of a change of a moment arm of a force applied to the breaking lever of the spring controlling device illustrated in FIG. 1;

FIG. 8(*b*) is a graph showing characteristics of a change of a moment arm of force applied to the making lever of the spring control device illustrated in FIG. 1;

DETAILED DESCRIPTION OF THE PREFERRED EMBODIMENTS

A detailed explanation will be given of preferred embodiments of the present invention in reference to FIGS. 1 through 13 as follows, wherein the same numerical references are used for the same or the similar portions and description of these portions is omitted.

Embodiment 1

Figure 1:
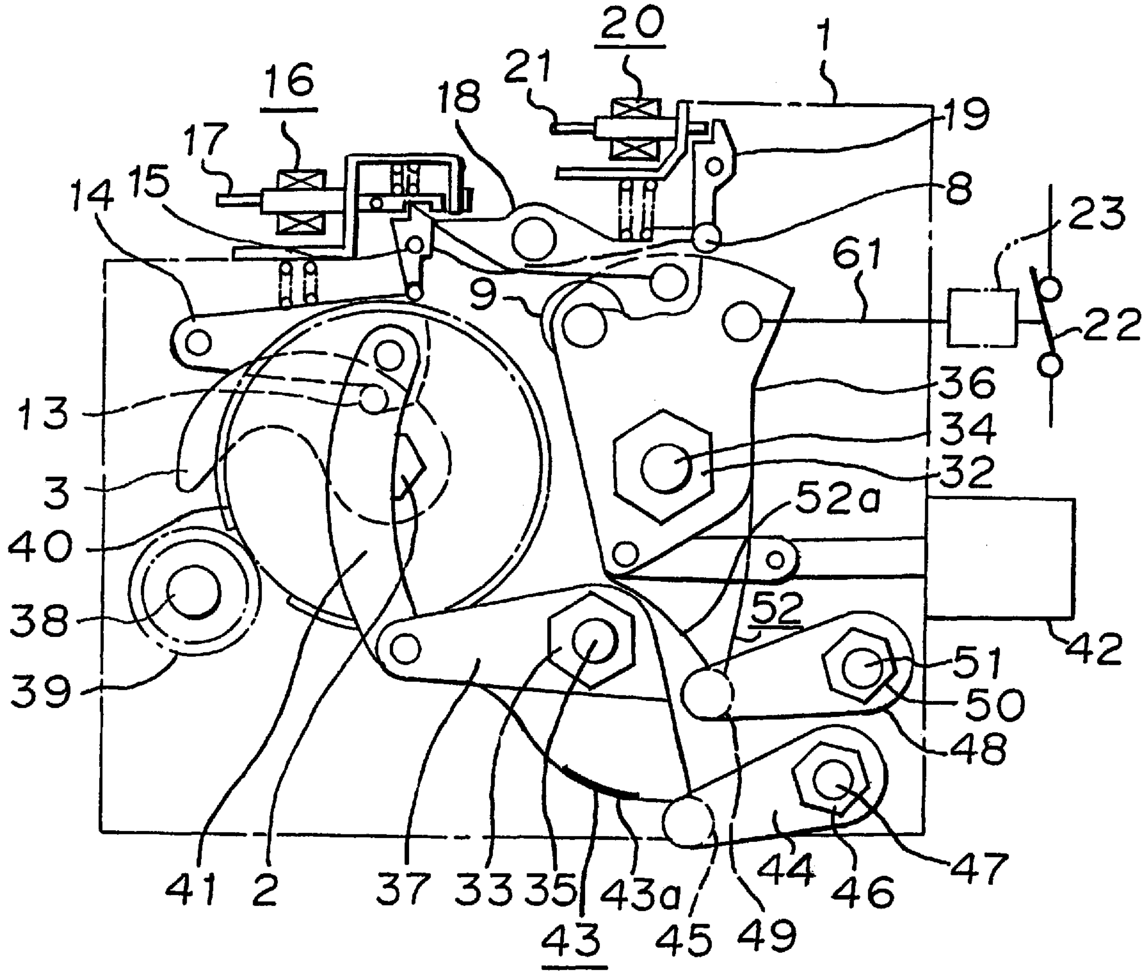
FIG. 1 illustrates an important portion of a spring controlling device according to an embodiment of the present invention.
Figure 2:
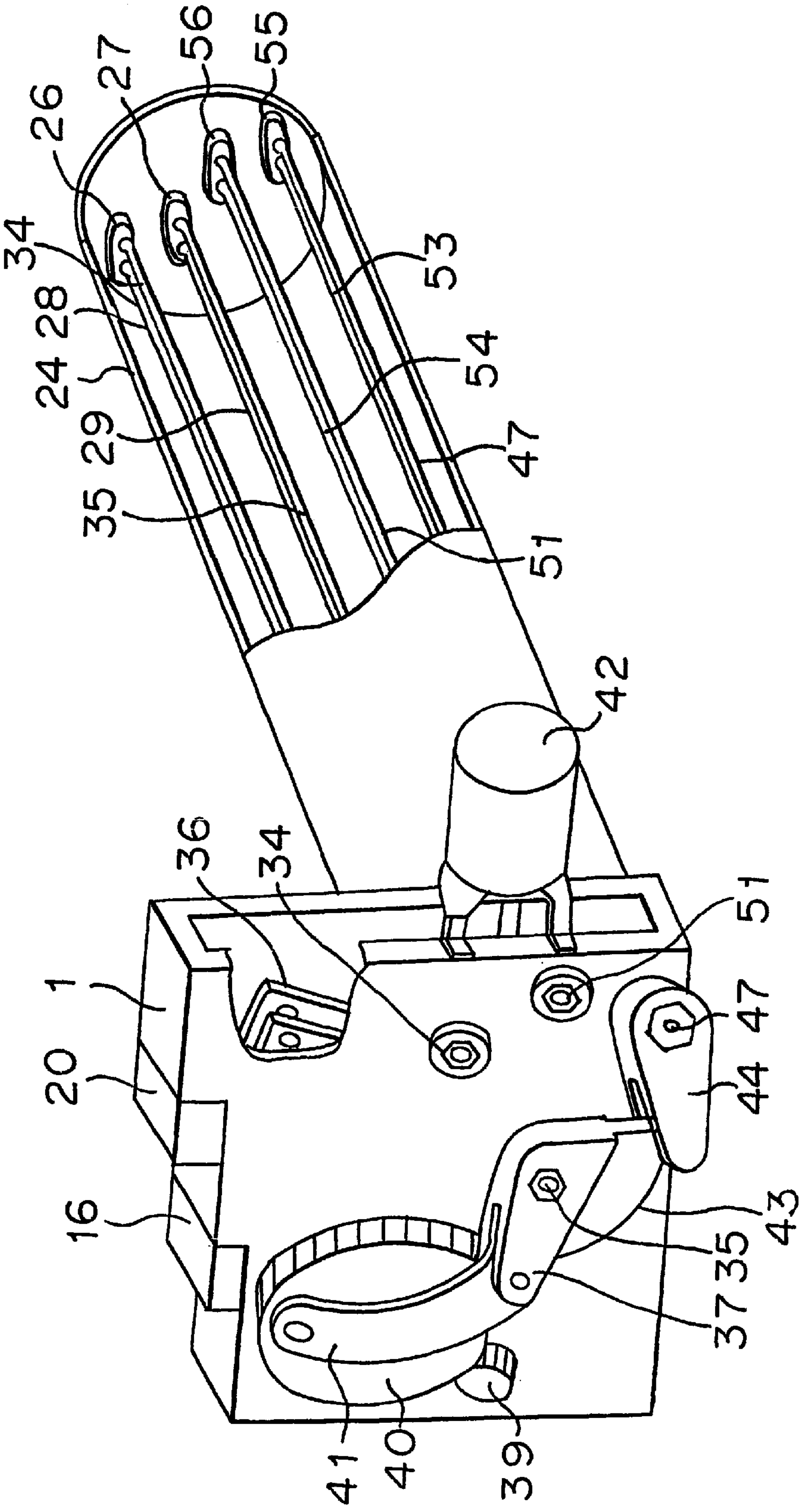
FIG. 2 is a perspective view of the spring controlling device illustrated in FIG. 1.
Figure 3:
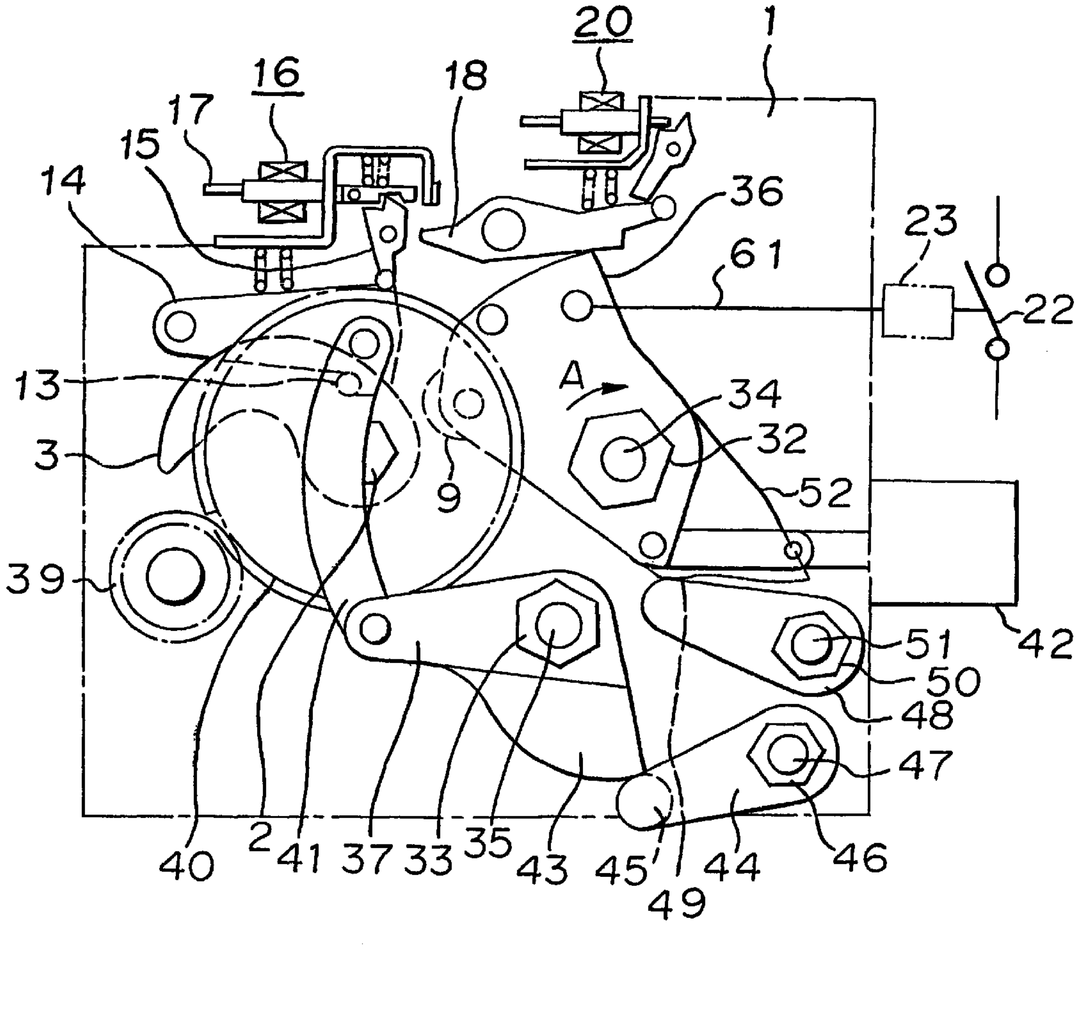
FIG. 3 illustrates a state of the spring controlling device illustrated in FIG. 1 when a breaker is opened.
Figure 4:
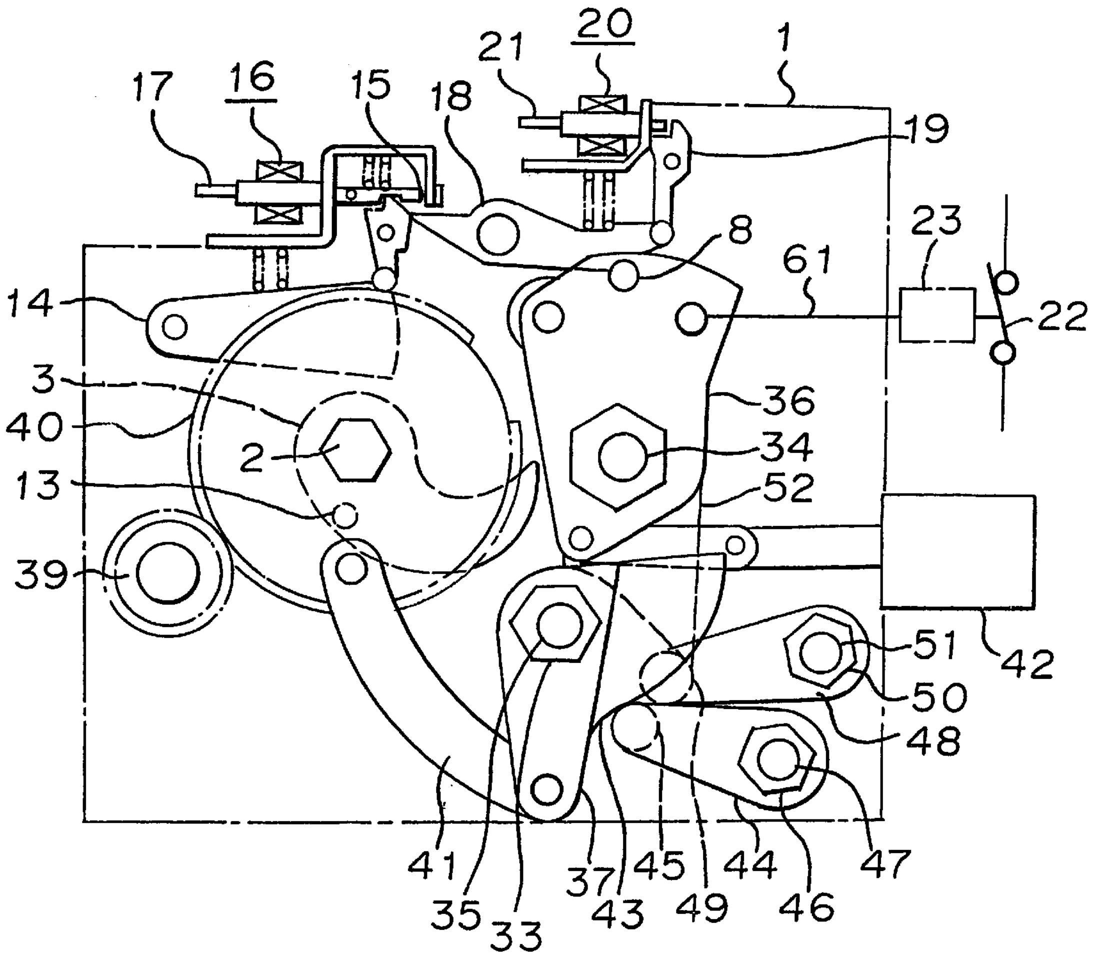
FIG. 4 illustrates a state of the spring controlling device illustrated in FIG. 1 when a torsion bar for closing a circuit is released.
Figure 5:
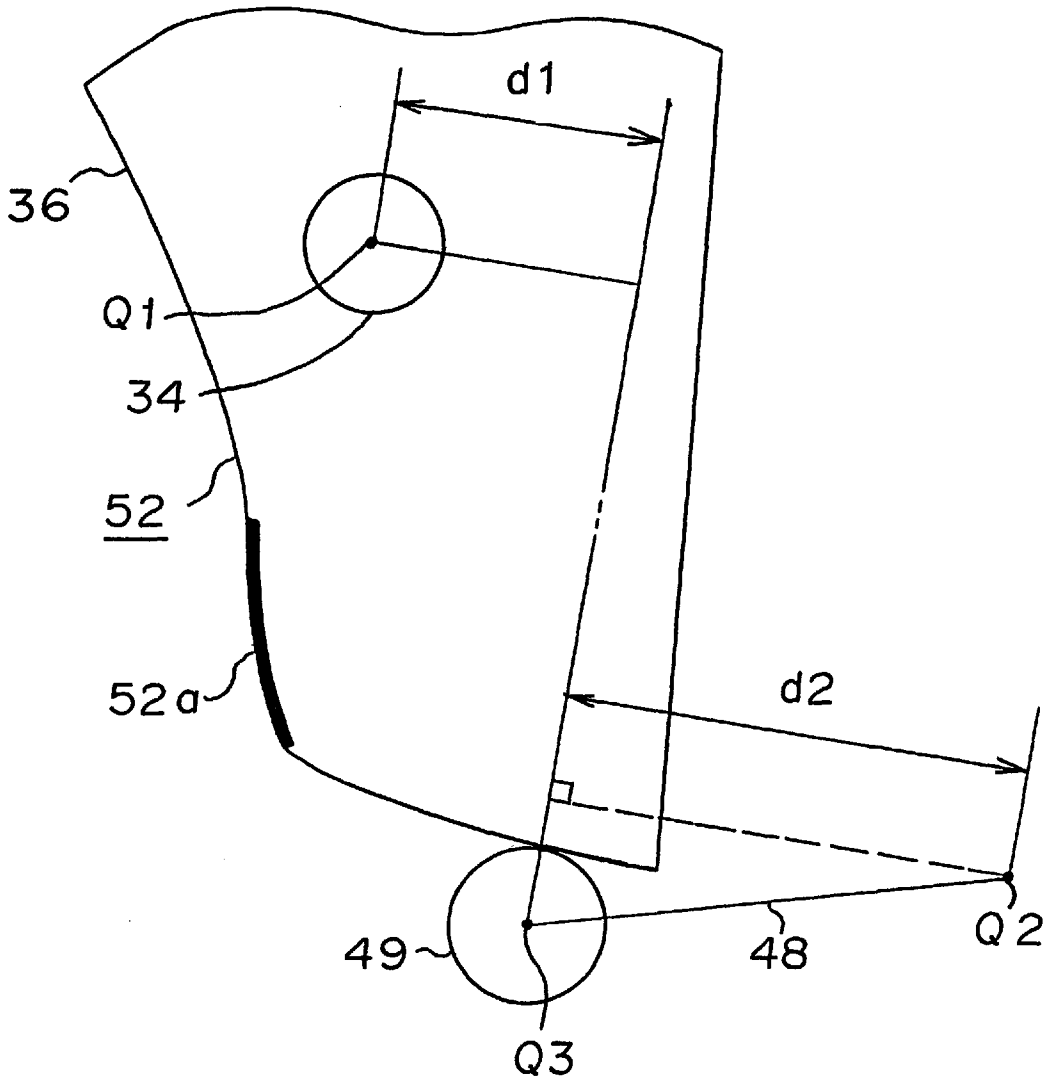
FIG. 5 is a side view of a breaking lever of the spring controlling device illustrated in FIG. 1 for explaining a rotational force applied to the breaking lever.

FIGS. 1 through 8 illustrate an embodiment of the present invention, wherein FIG. 1 illustrates a structure of an important portion of a spring controlling device when a circuit is closed; and FIG. 2 is a perspective view of the spring controlling device. FIG. 3 illustrates a state of the spring controlling device when a breaker is opened; and FIG. 4 illustrates a state of the spring controlling device when a torsion bar for closing the circuit of the breaker is released. FIG. 5 is a graph showing characteristics of rotational force of a breaking lever included in the spring controlling device.

Figure 6:
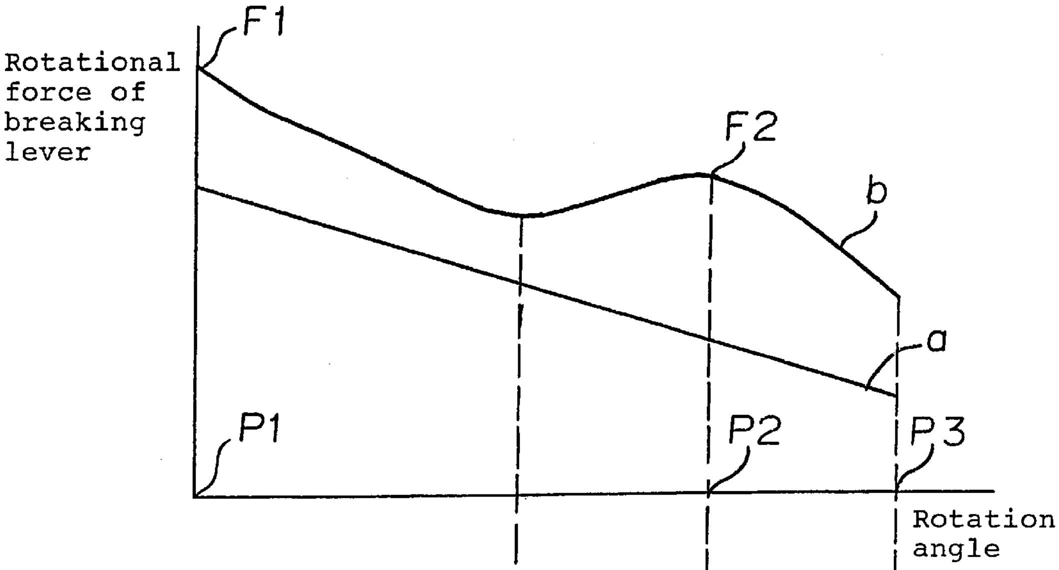
FIG. 6(*a*) is a graph showing characteristics of a change of the rotational force applied to the breaking lever of the spring controlling device illustrated in FIG. 1.
Figure 6:
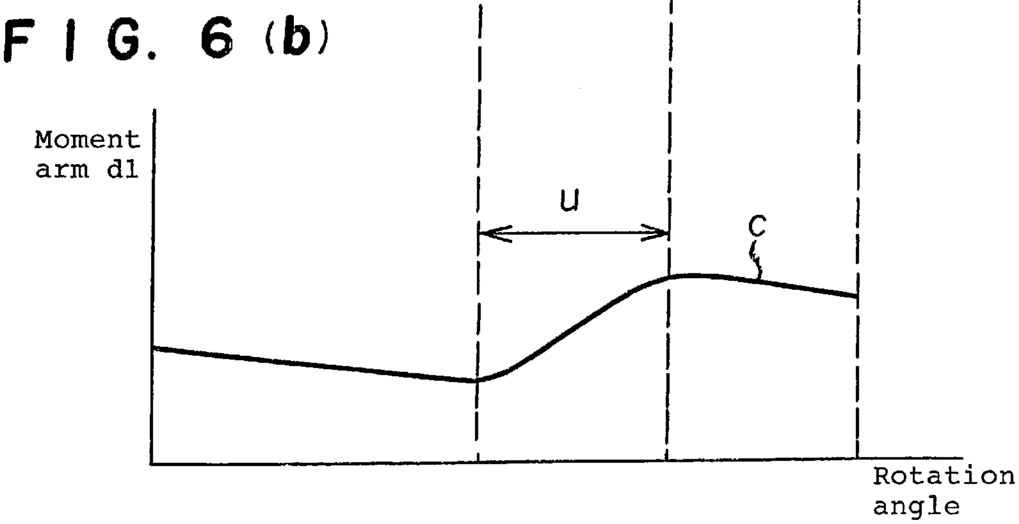
Figure 7:
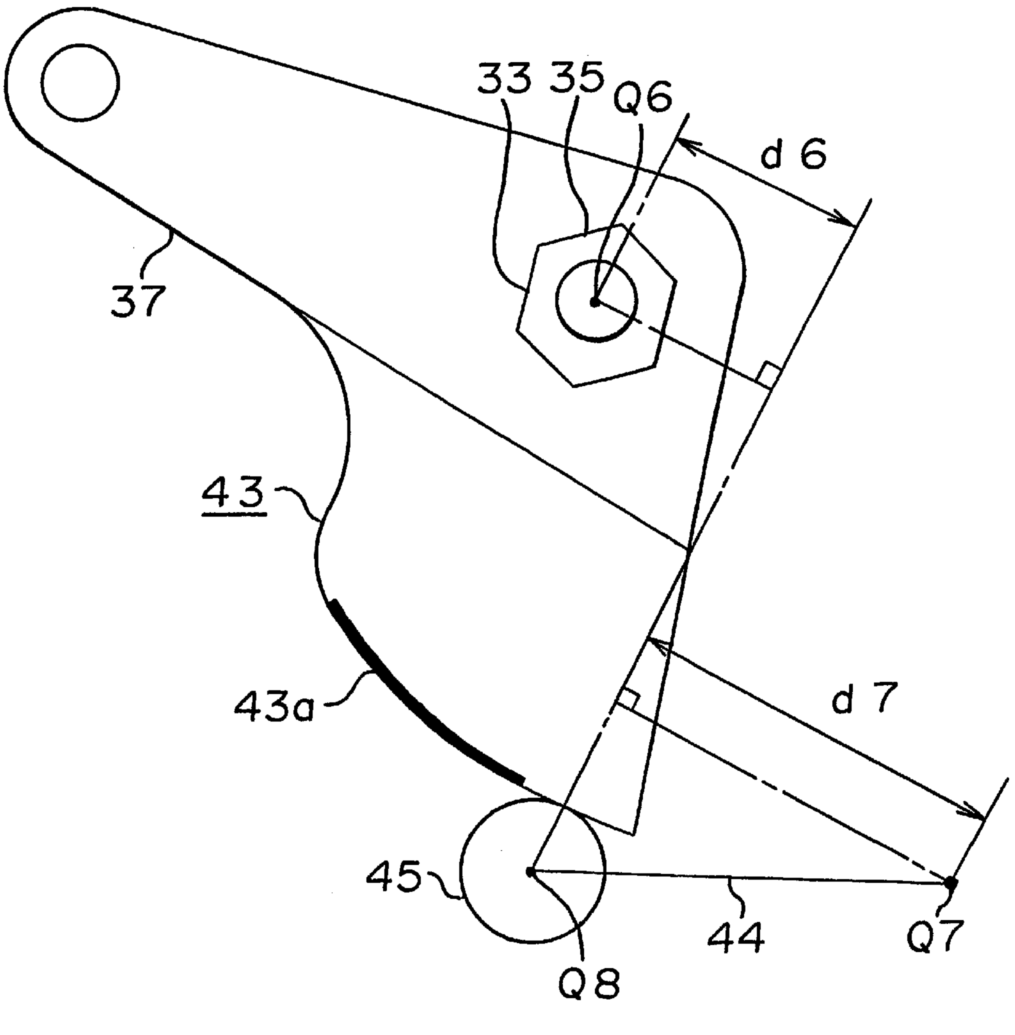
FIG. 7 is a side view of a part of the spring controlling device for explaining a rotational force applied to a making lever.
Figure 8:
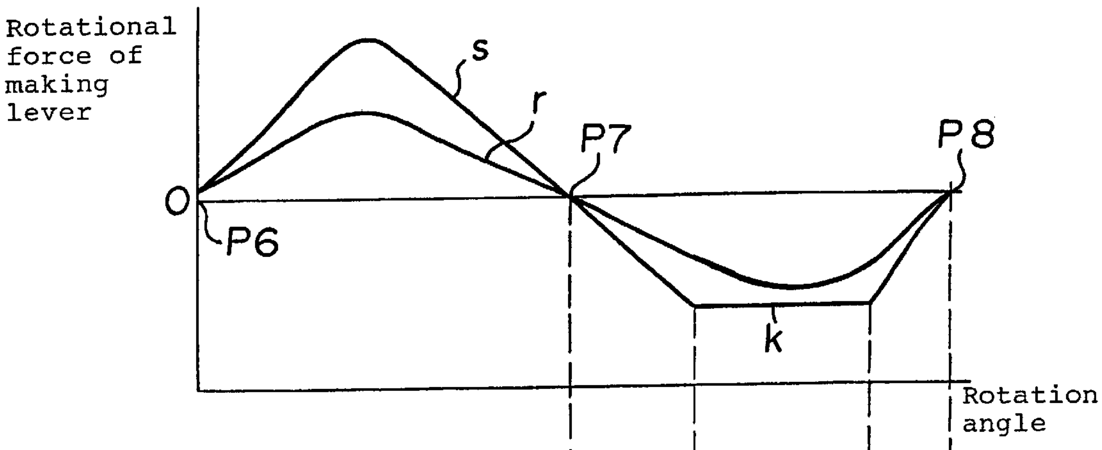
FIG. 8(*a*) is a graph showing characteristics of a change of the rotational force applied to the making lever of in the spring controlling device illustrated in FIG. 1.
Figure 8:
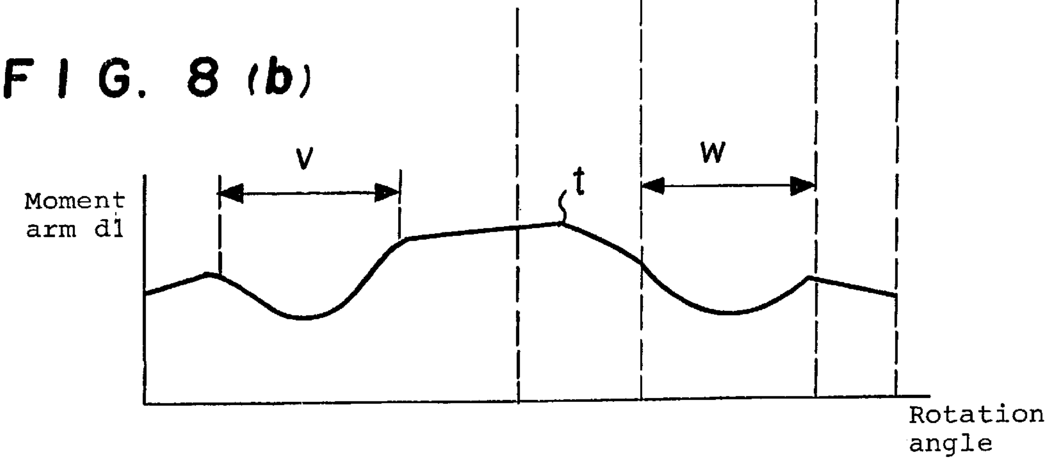

FIG. 6(*a*) is a graph showing characteristics of a change of rotational force applied to the breaking lever included in the spring controlling device. FIG. 6(*b*) is a graph showing characteristics of a change of a moment arm of a force applied to the breaking lever. FIG. 7 explains a rotational force applied to a making lever of the spring controlling device. FIG. 8(*a*) is a graph showing characteristics of a change of a rotational force of the making lever included in the spring controlling device. FIG. 8(*b*) is a graph showing characteristics of a change of a moment arm of a force applied to the making lever.

In these figures, numerical reference 1 designates a casing; numerical reference 24 in FIG. 2 designates a cylinder fixed to the casing 1; numerical references 26, 27 in FIG. 2 designate levers rotatably engaged with pins (not shown) located in ends of the cylinder 24. Numerical reference 28 in FIG. 2 designates a torsion bar for opening a circuit, one end of which is fixed to the casing 1 and the other end is fixed to the lever 26; and numerical reference 34 designates a torsion bar for opening the circuit, one end of which is fixed to the lever 26 and the other end is fixed to a rotating shaft 32. The torsion bars 28, 34 for opening the circuit are fabricated to work as a single torsion bar elongated in serial in use of the lever 26.

Numerical reference 29 in FIG. 2 is a torsion bar for closing the circuit, one end of which is fixed to the casing 1 and the other end is fixed to the lever 27; and numerical reference 35 designates a torsion bar for closing the circuit, one end of which is fixed to the lever 27 and the other end is fixed to the rotating shaft 33. The torsion bars 29, 35 for closing the circuit are fabricated to work as a single torsion bar elongated in serial in use of the lever 27.

Numerical references 55, 56 are levers rotatably engaged with pins (not shown) provided in the end of the cylinder 24. Numerical reference 47 is a torsion bar for aiding closing of the circuit, one end of which is fixed to a rotating shaft 46 and the other end is fixed to the lever 55. Numerical reference 53 in FIG. 2 designates a torsion bar for aiding closing of the circuit, one end of which is fixed to the casing 1 and the other end is fixed to the lever 55. The torsion bars 47, 53 for aiding closing of the circuit are fabricated to work as a single torsion bar elongated in serial in use of the lever 55.

Numerical reference 51 designates a torsion bar for aiding opening of the circuit, one end of which is fixed to a rotating shaft 50 and the other end is fixed to the lever 56. Numerical reference 54 in FIG. 2 designates a torsion bar for aiding opening of the circuit, one end of which is fixed to the casing 1 and the other end is fixed to the lever 56. The torsion bars 51, 54 for aiding opening of the circuit are fabricated to work as a single torsion bar elongated in serial in use of the lever 56.

Hereinbelow, the spring controlling device will be described mainly in reference of FIG. 1. Numerical reference 37 designates a making lever fixed to the rotating shaft

33, wherein the rotating shaft 33 is fixed to the torsion bar 35 for closing the circuit and applied with a rotational force in the counterclockwise direction by the torsion bars 29, 35 for closing the circuit. Numerical reference 2 designates a cam shaft supported by the casing 1; and numerical reference 3 designates a cam attached to the cam shaft 2 for making. Numerical reference 13 designates a making latch engaging pin provided in the cam 3; numerical reference 14 designates a making latch engaged with the making latch engaging pin 13; and numerical reference 15 is a making trigger engaged with the making latch 14. Numerical reference 16 designates a making electromagnet having a plunger 17.

Numerical reference 38 designates a rotating shaft supported by the casing 1, which is driven in the counterclockwise direction in FIG. 1 by a motor (not shown). Numerical reference 39 designates a pinion fixed to the rotating shaft; numerical reference 40 designates a gear arranged to engage with the pinion 39, which gear is fixed to the cam shaft 2, wherein a part of the teeth is removed such that engagement with the pinion 39 is released under a state that the torsion bars 29, 35 for closing the circuit illustrated in FIG. 2 are prestressed. Numerical reference 41 designates a link connecting the making lever 37 to the gear 40.

Numerical reference 44 designates an ancillary making lever fixed to the rotating shaft 46 applied with rotational force in the clockwise direction by the torsion bars 47, 53 for aiding closing of the circuit when the torsion bars 47, 53 for aiding closing of the circuit are prestressed in FIG. 1. The torsion bars 47, 53 for aiding closing of the circuit and the torsion bars 29, 35 for closing the circuit are arranged such that twisting directions under a prestressed state are opposite and the rotational forces are substantially the same to offset or reduce a rotational force exerted on the casing 1. By reducing the rotational force exerted on the casing 1, even though prestressing forces of the torsion bars 29, 35, 47, 53 are increased, it is not necessary to enhance the rigidity of the casing 1 and the size and the weight can be prevented from increasing.

Numerical reference 43 designates a cam integrally formed with the making lever 37, working to interlock closing of the circuit; and numerical reference 45 designates a roller provided in the ancillary making lever 44. The roller 45 is constantly in contact with the cam 43 by spring force caused by the torsion bars 47, 53 for aiding closing of the circuit. The spring force of the torsion bars 47, 53 for aiding closing of the circuit is transmitted to the making lever 37 by the roller 45 and the cam 43. Rotational force of the making lever 37 is transmitted to the gear 40 via the link 41.

Numerical reference 36 designates a breaking lever fixed to the rotational shaft 32. The rotational shaft 32 is fixed to the torsion bar 34 for opening the circuit so as to be applied with a rotational force in the counterclockwise direction by the torsion bars 28, 34 for opening the circuit illustrated in FIG. 2. Numerical reference 8 designates a releasing latch engaging pin provided in the breaking lever 36; and the numerical reference 9 designates a roller provided in the breaking lever 36. Numerical reference 18 designates a releasing latch engaged with the releasing latch engaging pin 8.

Numerical reference 19 designates a releasing trigger engaged with the releasing latch 18. Numerical reference 20 designates a releasing electromagnet having a plunger 21. Numerical reference 22 designates a movable contact of the breaker, which is connected to the breaking lever 36 through a linkage mechanism 23 and a rod 61. Details of the movable contact 22 and the rod 61 are similar to those described in reference of FIG. 18. Numerical reference 42 designates a buffer connected to the breaking lever 36 provided to relax an impact at time of opening and closing the movable contact 22.

Numerical reference 48 designates an ancillary breaking lever fixed to the rotational shaft 50 applied with a rotational force in the clockwise direction in FIG. 1 by the torsion bars 51, 54 for aiding to open the circuit. Twisting directions of the torsion bars 51, 54 for aiding to open the circuit and the torsion bars 28, 34 for opening the circuit are adverse under a prestressed state and rotational forces thereof are substantially the same to thereby offset or reduce a rotational force effecting on the casing 1. By reducing the rotational force effecting on the casing 1, it is not necessary to enforce the rigidity of the casing 1 and the size and the weight can be prevented from increasing.

Numerical reference 52 designates a cam integrally formed with the breaking lever 36, which cam is interlocked with opening of the circuit. The cam 52 includes a curved portion 52a in FIG. 5, which is formed to be a predetermined shape. Numerical reference 49 designates a roller provided in the ancillary breaking lever 48, constantly in contact with the cam 52 by spring force of the torsion bars 51, 54 for aiding to open the circuit. The spring force of the torsion bars 51, 54 for aiding to open the circuit is transmitted to the breaking lever 36 through the roller 43 and the cam 52. In other words, both of the spring forces of the torsion bars 28, 34 and the torsion bars 51, 54 are applied to the breaking lever 36.

The device for closing the circuit according to the present invention includes the making latch 14, the making electromagnet 16, the cam shaft 2, the cam 3, the gear 40, the link 41, the making lever 37, the cam 43, the torsion bars for closing the circuit 29, 35, the ancillary making lever 44, the torsion bars for aiding to close the circuit 47, 53 and so on. Further, the device for opening the circuit according to the present invention includes the releasing latch 18, the releasing electromagnet 20, the breaking lever 36, the torsion bars 28, 34 for opening the circuit, the cam 52, the ancillary breaking lever 48, the torsion bars 51, 54 for aiding to open the circuit, and so on.

The casing 1 is a supporting member commonly used for the torsion bars 28, 34 for opening the circuit, being an elastic member, and the torsion bars 51, 54 for aiding to open the circuit, also being an elastic member. The casing also serves as the supporting member commonly used for the torsion bars 29, 35 for closing the circuit, being an elastic member, and the torsion bars 47, 53 for aiding to close the circuit, being an elastic member.

In the next paragraphs, an operation will be described.

At first, an operation of opening the circuit will be described. The ancillary breaking lever 48 is constantly applied with a rotational force in the clockwise direction in FIG. 1 by the torsion bars 51, 54 for aiding to close the circuit. This rotational force is transmitted to the breaking lever through the roller 49 and the cam 52 of the breaking lever 36 to apply the rotational force in the counterclockwise direction to the breaking lever 36, which rotational force is the sum of a rotational force as a releasing force transmitted from the torsion bars 51, 54 for aiding to open the circuit and a rotational force as a releasing force by the torsion bars 28, 34 for opening the circuit. This rotational force is maintained by the releasing latch 18 and the releasing trigger 19.

When the releasing electromagnet 20 is excited in this state, the plunger 21 is rightward moved; the releasing trigger 19 rotates in the clockwise direction; and engagement with the releasing latch 18 is released. The releasing latch 18 rotates in the counterclockwise direction by a counterforce from the releasing latch engaging pin 8. Then, the breaking lever 36 rotates in the counterclockwise direction, and the movable contact 22 is driven in a direction of opening the circuit, i.e. a leftward direction in FIG. 1. A state completed with an operation of opening the circuit is illustrated in FIG. 3.

Hereinbelow, the rotational angle and the rotational force of the breaking lever 36 will be described.

FIG. 6(*a*) is a graph showing a relationship between the rotational angle of the breaking lever 36 and the rotational force as the releasing force. In FIG. 6(*a*), a line a represents a relationship between the rotational angle of the breaking lever 36 and the rotational force by the torsion bars 28, 34 for opening the circuit. The rotational force by the torsion bars 28, 34 for opening the circuit linearly decreases from a start point P1 and an end point P3 of the releasing operation.

A curve b represents a change of the rotational force of the breaking lever 36 integrally formed with the cam 52. The curve b is obtained by adding the rotational force by the torsion bars 28, 34 for opening the circuit to the rotational force by the torsion bars 51, 54 for aiding to open the circuit. The rotational force of the breaking lever 36 is maximum at the start point P1 of the releasing operation and a local maximum value at a point P2 in a middle of a releasing operation. A difference between the curve b and the line a in a coordinate of the graph is the rotational force of the breaking lever 36 by the torsion bars 51, 54 for aiding to open the circuit.

In this embodiment, rotational force F1 at the start point P1 of releasing is made large as the curve b in FIG. 6(*a*) to increase an initial acceleration. Further, rotational force F2 at the point P2 in the middle is made locally maximum to apply a strong force against a peak pressure in a cylinder 71 illustrated in FIG. 18 in the latter half of the breaking operation for intensely blowing an arc-extinguishing gas to the make break contact, whereby a capability of breaking is improved.

Further, a detail for realizing the characteristics indicated by the curve b will be described.

FIG. 5 explains a relationship between the cam 52 integrally formed with the breaking lever 36 and the ancillary breaking lever 48. In FIG. 5, numerical references Q1, Q2 and Q3 respectively designate rotational centers of the cam 52 (breaking lever 36), the ancillary breaking lever 48 and the roller 49. Numerical reference d1 designates a moment arm of a force received by the cam 52 from the ancillary breaking lever 48, and numerical reference d2 designates a moment arm of a force applied to the cam 52 from the ancillary breaking lever 48. In FIG. 5, the ancillary breaking lever 48 is simply indicated by a single line.

The curved portion 52*a* of the cam is shaped as illustrated in FIG. 5, and a relationship between the roller 49 and the curved portion 52*a* is as illustrated in FIG. 5. The moment arm d1 changes as in the curve c of FIG. 6(*b*) along with rotation of the cam 52 of the breaking lever 36. A section u in FIG. 6(*b*) represents a condition of a change of the moment arm when the roller 49 moves along the curved portion 52*a*.

The moment arm d2 of the force exerted on the cam 52 from the ancillary breaking lever 48 does not largely change even though the cam is rotated because the shape of the curved portion 52*a* and a relationship between the curved portion 52*a* and the roller 49 are as in FIG. 5. Therefore, the rotational force of the torsion bars 51, 54 for aiding to open the circuit becomes substantially similar to the curve c in FIG. 6(*b*). Accordingly, the rotational force of the breaking lever 36 becomes like the curve b by adding the rotational force of the torsion bars 51, 54 for aiding to open the circuit to the line a.

The rotational force of the breaking lever 36 can be arbitrarily designed by changing the shape of the cam 52.

An operation of closing the circuit will be described in reference of FIG. 3. The rotational force is constantly applied to the ancillary making lever 44 in the clockwise direction by the torsion bars 47, 53 for aiding to close the circuit, which rotational force is transmitted to the making lever 37 via the roller 45 and the cam 43 to thereby apply a rotational force in the counterclockwise direction to the making lever 37.

The making lever 37 is constantly applied with the rotational force in the counterclockwise direction, being the sum of the rotational force as a releasing force transmitted from the torsion bars 47, 53 for aiding to close the circuit and the rotational force as a releasing force applied by the torsion bars 29, 53 for closing the circuit. This rotational force is transmitted to a cam via the link 41, the gear 40 and the cam shaft 2 to apply a rotational force to the cam 3 in the clockwise direction. This rotational force is retained by the making latch 14 and the making trigger 15.

In this state illustrated in FIG. 3, when the making magnet 16 is excited, the plunger 17 moves in the rightward direction to release engagement with the making latch 14. When the making latch 14 and the making trigger 15 are disengaged, the making latch 14 rotates in the counterclockwise direction by a counterforce from the making latch engaging pin 13, whereby the making latch 14 is released from the making latch engaging pin 13. At this time, the cam 3 rotates in the clockwise direction by releasing forces of the torsion bars 29, 35, 47, 53 for closing the circuit and for aiding to close the circuit.

Then, the cam 3 lifts the roller 9 provided in the breaking lever 39 at its end. Therefore, the breaking lever 36 is driven in the clockwise direction while twisting the torsion bars 28, 34 for opening the circuit and torsion bars 51, 54 for aiding to open the circuit, whereby the torsion bars 28, 34, 51, 54 are prestressed.

As described, in the operation of closing the circuit, the torsion bars 29, 35 for closing the circuit and the torsion bars 47, 53 for aiding to close the circuit are released while prestressing the torsion bars 28, 34 for opening the circuit and the torsion bars 51, 54 for aiding to open the circuit from the state illustrated in FIG. 3. Therefore, an energy of prestressing the torsion bars 29, 35 for closing the circuit and the torsion bars 47, 53 for aiding to close the circuit is larger than an energy of prestressing the torsion bars 28, 34 for opening the circuit and the torsion bars 51, 54 for aiding to open the circuit.

In FIG. 4, the operation of closing the circuit is completed, wherein the torsion bars 28, 34, 51, 54 for opening the circuit and for aiding to open the circuit are prestressed; the releasing latch engaging pin 8 is retained by the releasing latch 18; and the torsion bars 29, 35 for closing the circuit and the torsion bars 47, 53 for aiding to close the circuit are released.

Prestressing from a state that the torsion bars 29, 35 for closing the circuit and the torsion bars 47, 53 for aiding closing of the circuit illustrated in FIG. 4 is operated as follows.

The gear 40 rotates in the clockwise direction by rotation of the pinion 39 in the counterclockwise direction by a motor (not shown), the making lever 37 and the rotating shaft 33 are driven in the clockwise direction via the link 41 to prestress the torsion bars 29, 35 for closing the circuit.

Because the making lever 37 rotates in the clockwise direction, the cam 43 also rotates in the clockwise direction. The cam 43 pushes the roller 45 to thereby rotate the ancillary making lever 44 and the rotating shaft 46 in the counterclockwise direction, whereby the torsion bars 47, 53 for aiding to close the circuit are prestressed. Further, when the large gear 40 is rotated in the clockwise direction and passing through a dead point, at which a direction of pulling the link 41 overlaps the center of the cam shaft 2, the cam shaft 2 is applied with the rotational force in the clockwise direction via the link 41 by forces of torsion bars 29, 35 for closing the circuit and the torsion bars 47, 53 for aiding to close the circuit.

Because a part of the teeth of the large gear 40 is removed, engagement between the pinion 39 and the gear 40 is released. The operation of prestressing is completed after the making latch 14 is engaged with the making latch engaging pin 13 to hold a rotational force in the clockwise direction of the gear applied by forces of the torsion bars 29, 35 for closing the circuit and the torsion bars 47, 53 for aiding to close the circuit. Thus, all torsion bars for opening the circuit, for aiding to open the circuit, for closing the circuit and for aiding to close the circuit are again prestressed as illustrated in FIG. 1.

Hereinbelow, a rotational angle and a rotational force of the making lever 37 will be described.

FIG. 8(*a*) shows characteristics of a relationship between the rotational angle and the rotational force as a releasing force both of the making lever 37 in FIG. 8(*a*), a curve r represents the relationship between the rotational angle of the making lever 37 and the rotational force by the torsion bars 29, 35 for closing the circuit, wherein the curve r changes like a sine wave from a start point P6 of a releasing operation of the torsion bars 29, 35 for closing the circuit to an end point P7. The curve r also changes like a sine wave from a start point P7 of a prestressing operation of the torsion bars 29, 35 for closing the circuit to an end point P8 in a similar manner thereto.

A curve s represents a change of the rotational force of the making lever 37 integrally formed with the cam 43, which curve is obtained by adding the rotational force by the torsion bars 29, 35 for closing the circuit to the rotational force of the torsion bars 47, 53 for aiding to close the circuit. The rotational force of the making lever 37 is small at the start point P6 of the releasing operation and becomes maximum in a middle of the releasing operation. A difference between the curve s and the curve r in an ordinate direction is the rotational force of the making lever 37 by the torsion bars 47, 53 for aiding to close the circuit.

Further, the rotational force applied to the making lever 37 at time of prestressing, namely a load applied to the prestressing device, becomes substantially zero at the start point P7 and the end point P8 of the prestressing operation. The curve s includes a substantially flat portion k which is obtained by limiting the maximum value in a middle of the prestressing operation.

The rotational force of the making lever 37 is arbitrarily designed by changing the shape of the cam 43.

In this embodiment, the shape of the curved portion 43*a* of the cam is formed such that a peak of the rotational force applied to the cam, namely the making lever 37, is flat as the portion k in FIG. 8(*a*) between the point P7 and the point P8 in the prestressing operation, whereby the maximum value of the rotational force applied to the making lever 37 is limited at time of prestressing. By limiting the maximum value, the maximum value of a force applied to the gear 40 at time of prestressing is reduced, whereby the gear 40 is miniaturized. Further, a load to intervening parts, e.g. the pinion 39, for transmitting the rotational force from the motor (not shown) to the gear 40 can be reduced. The maximum revolution number of the motor (not shown) can be reduced, whereby the prestressing device is miniaturized.

Further, how to realize characteristics of the curve s in FIG. 8(*a*) are described in detail. In FIG. 7, numerical references Q6, Q7 and Q8 respectively designate rotational centers of the cam 43 (making lever 37), the ancillary making lever 44, and the roller 45. Numerical reference d6 designates a moment arm of a force applied to the cam 43 from the ancillary making lever 44. Numerical reference d7 designates a moment arm of a force applied to the cam 43 from the ancillary making lever 44. In FIG. 7, the ancillary making lever 44 is simply represented by a single line.

By forming a curved portion 43*a* of the cam 43 as illustrated in FIG. 7, a relationship between the cam and the roller 45 is as illustrated in FIG. 7. The moment arm d6 of the force applied to the cam 43 from the torsion bars 47, 53 for aiding to close the circuit through the ancillary making lever 44 changes as a curve t in FIG. 8(*b*) along with rotation of the cam 43, i.e. the making lever 37. A section w in FIG. 8(*b*) represents a change of the moment arm d6 when the roller 45 moves on the curved portion 43*a*, wherein the change is a decrement shaped so as to downward protrude.

On the other hand, the moment arm d7 of the force applied to the cam 43 from the ancillary making lever 44 does not largely change even though the cam 43 is rotated because the relationship between the curved portion 43*a* and the roller 45 is as in FIG. 7, whereby the rotational force by the torsion bars 47, 53 for aiding to close the circuit becomes substantially similar to the curve t in FIG. 8(*b*). Accordingly, the rotational force of the making lever 37 becomes like the curve s, which is obtained by adding the rotational force of the torsion bars 47, 53 for aiding to close the circuit to the curve r.

Meanwhile, the moment arm d6 in the releasing operation is recessed like the section v in FIG. 8(*b*) by the curved portion 43*a*. However, the rotational force of the cam 43 is scarcely affected.

As described, by providing the torsion bars for aiding to open the circuit and for aiding to close the circuit in addition to the torsion bars for opening the circuit and for closing the circuit, it is possible to distribute prestressing of an energy necessary for opening the circuit or for closing the circuit to the main torsion bars and the aiding torsion bars. Accordingly, it is possible to restrict the lengths of the torsion bars even in case that the device is large, whereby the spring controlling device is miniaturized.

Further, the rotational force applied to the making lever 37 and the gear 40 is enabled to control by using the torsion bars 29, 35 for closing the circuit and by constituting such that prestressing force of the torsion bars 47, 53 for aiding to close the circuit is transmitted to the making lever 37 through the roller 45 and the cam 43 and by adjusting a shape of the curved portion 43*a* of the cam.

In other words, by restricting the maximum revolution number applied to the cam 3 by flattening a force applied to the making lever 37 at time of prestressing the torsion bars 47, 53 for aiding to close the circuit as the portion k in FIG. 8(*a*), it is possible to reduce a load applied to components such as the gear 40, and an output from the motor can be reduced. Accordingly, it is possible to miniaturized these components and accordingly the spring controlling device. Further, it is also possible to control the releasing force of the torsion bars 47, 53 for aiding to close the circuit by changing the shape of the cam 3.

Because, in the device for closing the circuit, the torsion bars 28, 34, 51, 54 for opening the circuit and for aiding to open the circuit are prestressed by the releasing force of the torsion bars 29, 35, 47, 53 for closing the circuit and for aiding to close the circuit, the number of components can be reduced in comparison with a case that the torsion bars for opening the circuit and for aiding to open the circuit are separately prestressed, whereby a structure is also simplified.

Further, the twisting directions of the torsion bars 28, 34 for opening the circuit and of the torsion bars 51, 54 for aiding to open the circuit are adverse and the twisting directions of the torsion bars 29, 35 for closing the circuit and of the torsion bars 47, 53 for aiding to close the circuit are adverse. The rotational forces by these pulling forces are set to be close in a prestressed state. Therefore, the rotational force applied to the casing is offset in the prestressed condition. Therefore, it is possible to reduce rotational force applied to the casing and to suppress the weight and the size of the device even when it is necessary to reinforce the casing for obtaining a high output, i.e. prestressing force.

By constituting such that the prestressing force of the torsion bars 51, 54 for aiding to open the circuit is transmitted to the breaking lever 36 through the roller 45 and the cam 43 in addition to that of the torsion bars 28, 34 for opening the circuit and designing such that the cam 43 is designed to have a predetermined shape, it is possible to control the output from the breaking lever 36, whereby the gas pressure in the cylinder 71 becomes sufficiently high at requisite timing. Thus, a flow rate of an arc-extinguishing gas is increased, and therefore a capability of breaking is improved.

Embodiment 2

Figure 9:
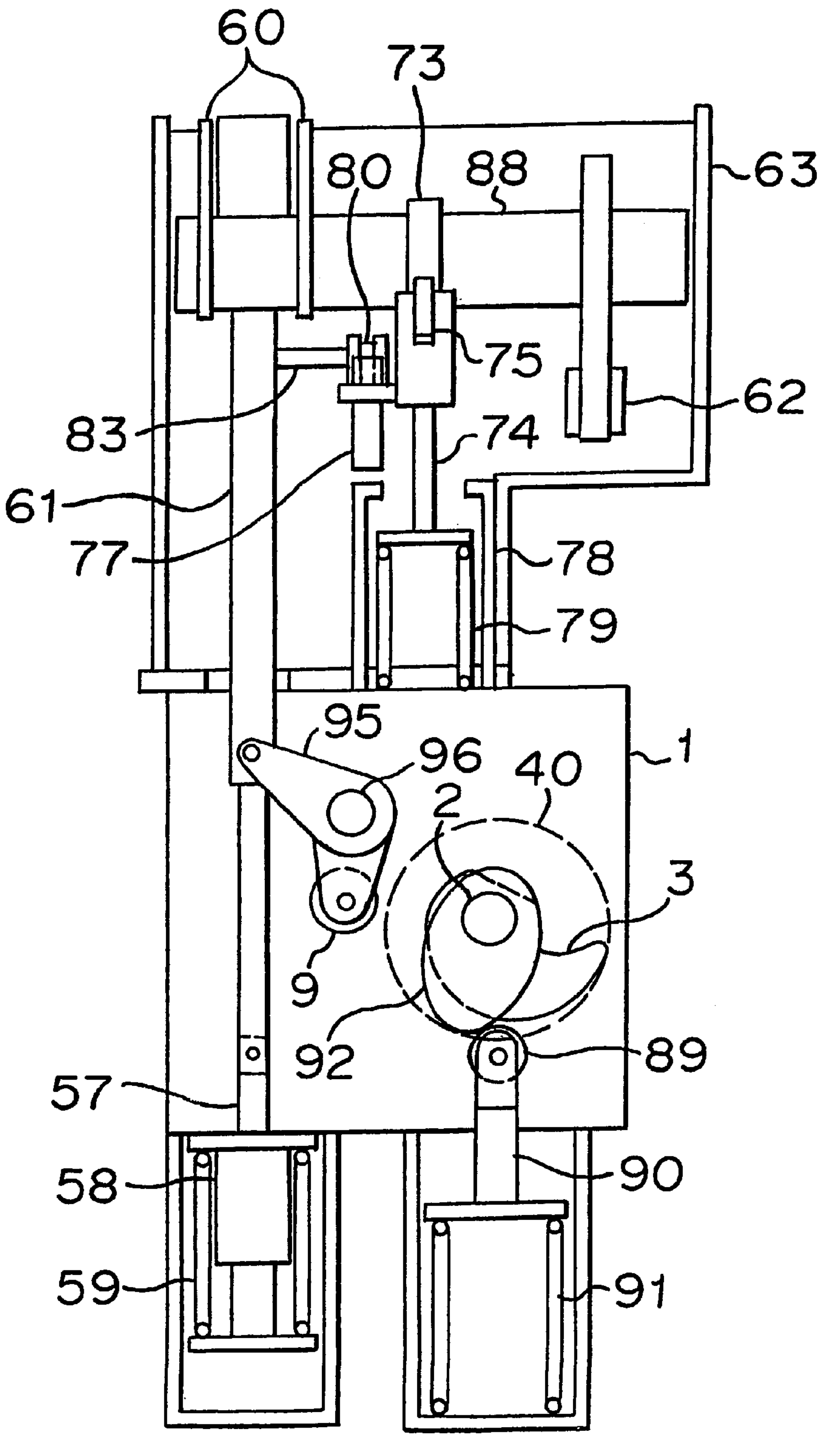
FIG. 9 illustrates an important portion of a spring controlling device according to another embodiment of the present invention.
Figure 10:
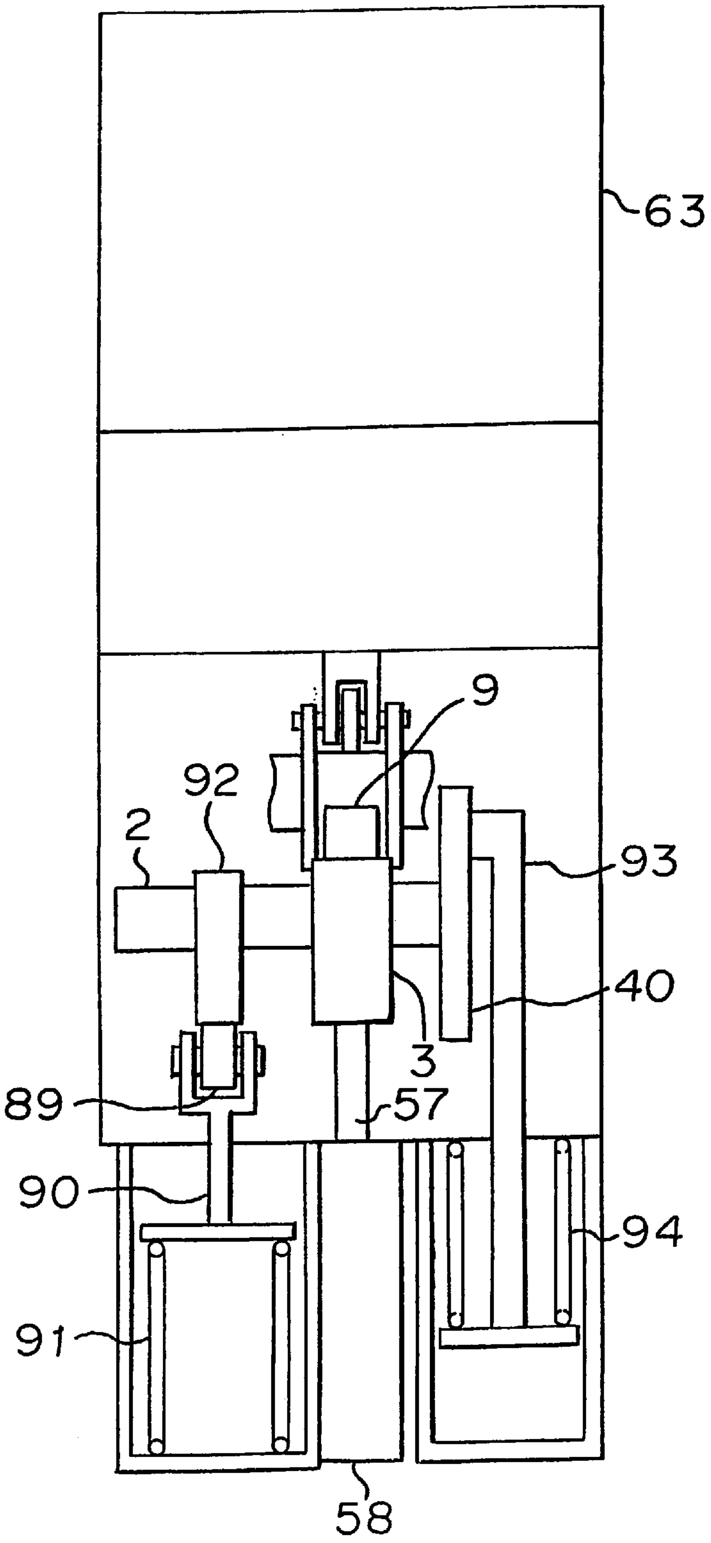
FIG. 10 is a side view of the spring controlling device illustrated in FIG. 9.
Figure 11:
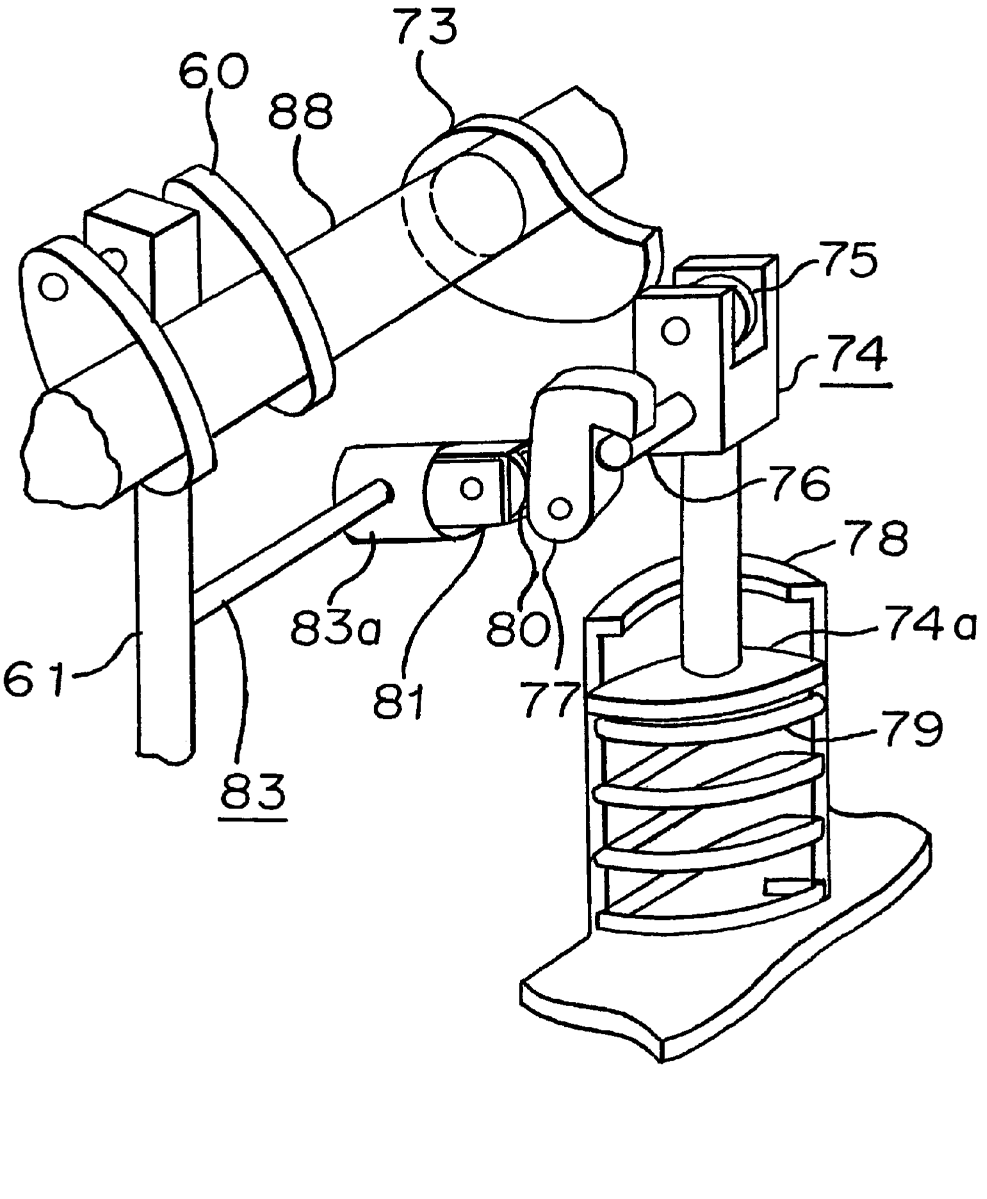
FIG. 11 is a perspective view of the spring controlling device illustrated in FIG. 9.
Figure 12:
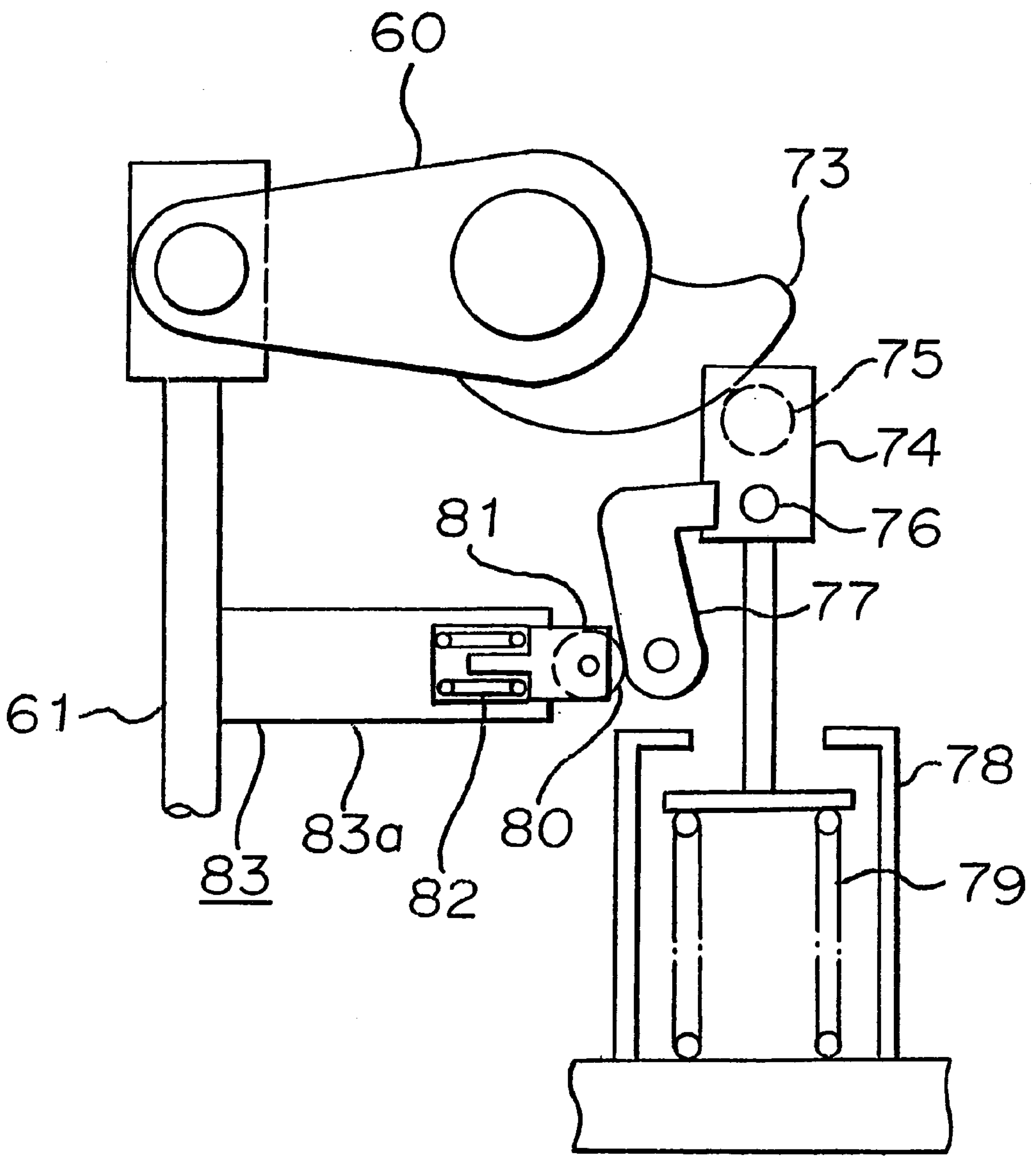
FIG. 12 illustrates a state of the spring controlling device illustrated in FIG. 9 in case that a breaker is opened.
Figure 13:
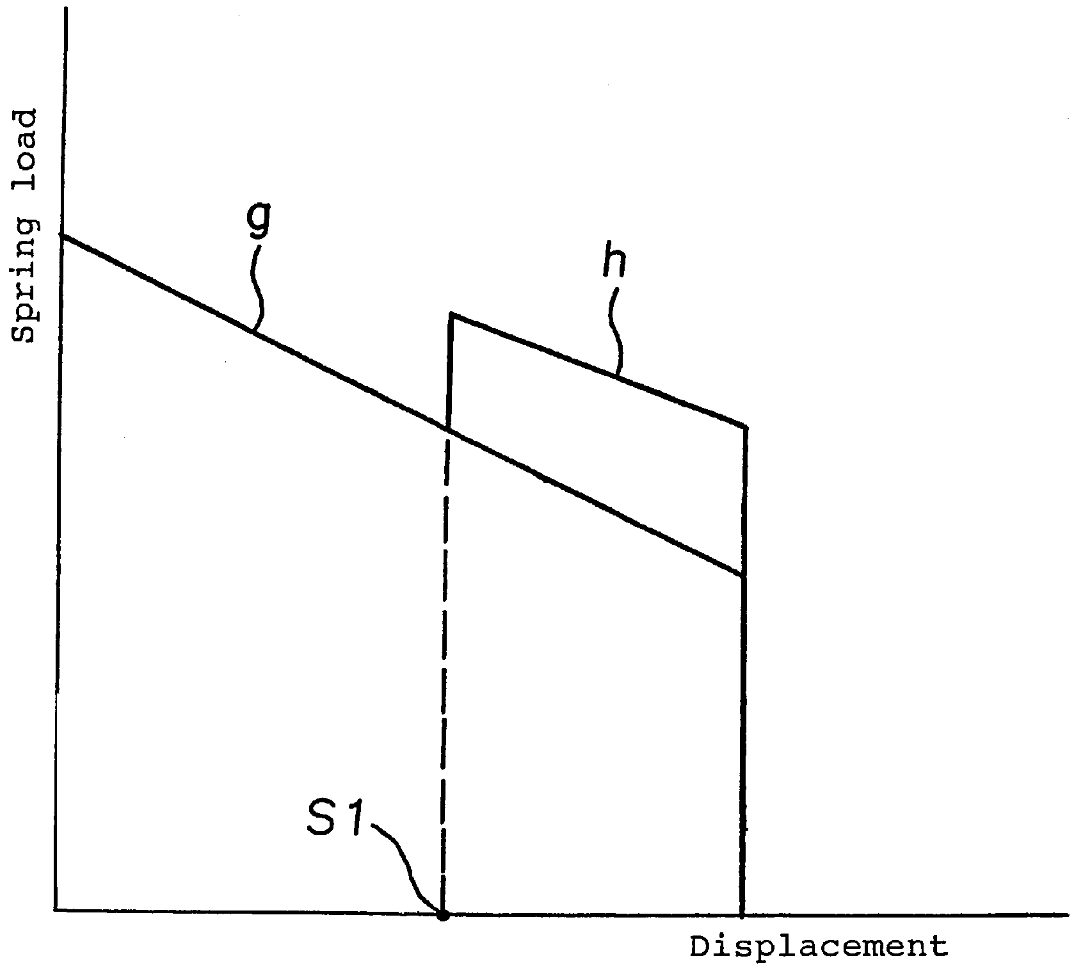
FIG. 13 is a graph showing characteristics of a load on coil springs for opening a circuit and for aiding to open the circuit of the spring controlling device illustrated in FIG. 9.
Figure 14:
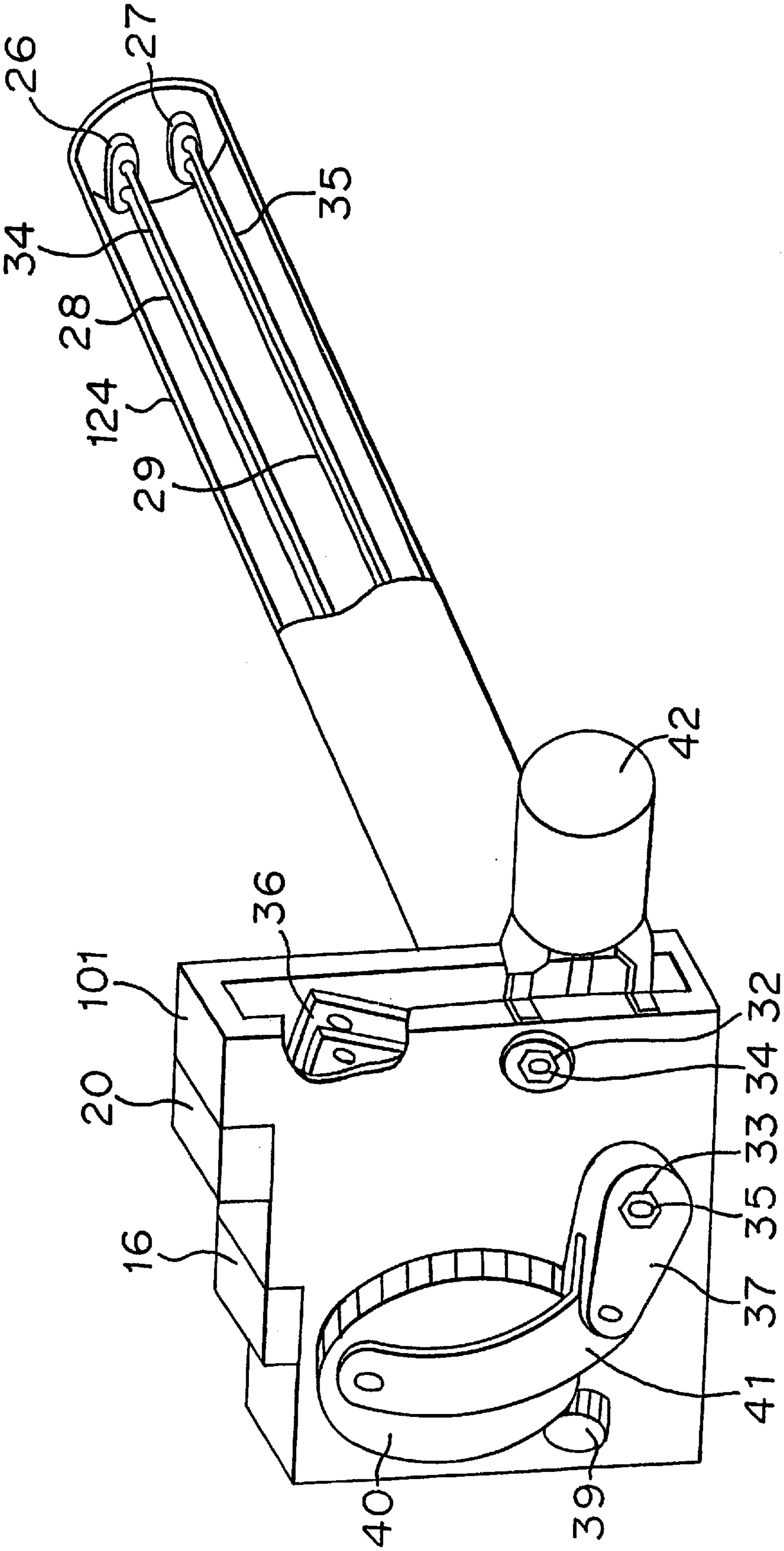
PRIOR ART FIG. 14
FIG. 14 is a perspective view of a conventional spring controlling device.
Figure 15:
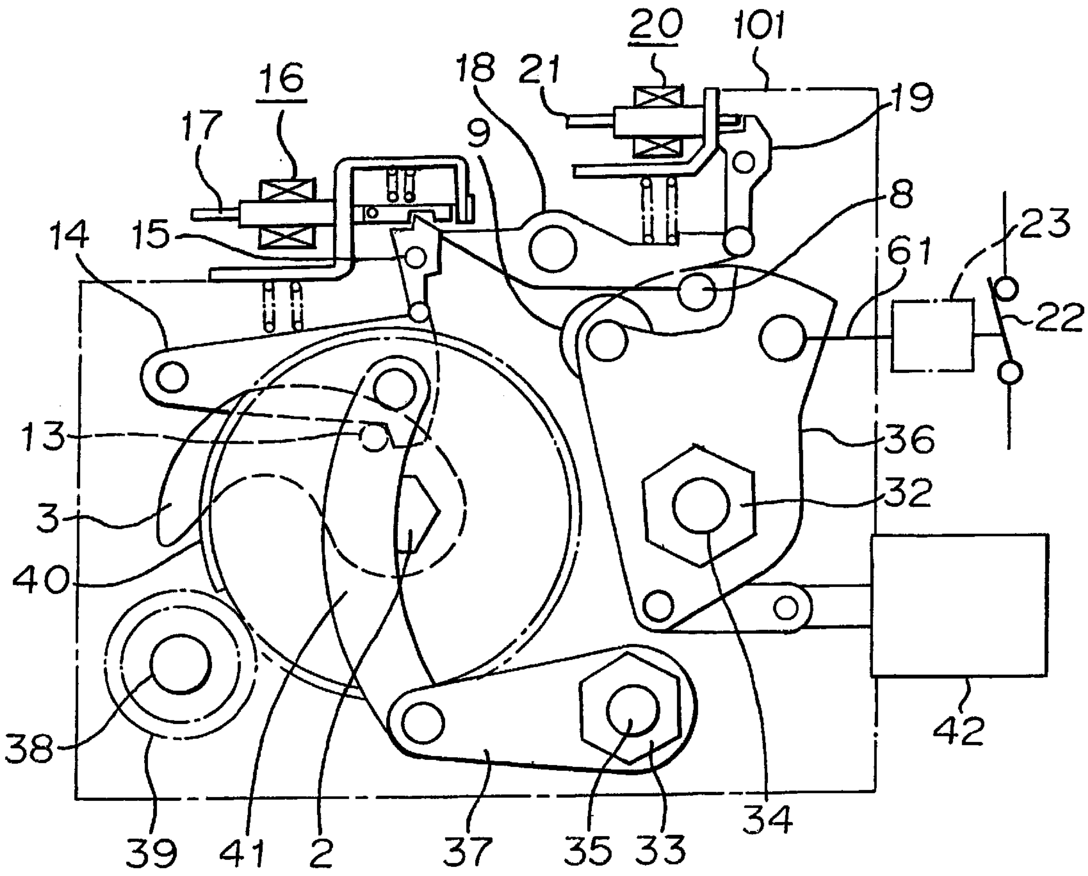
PRIOR ART FIG. 15
FIG. 15 illustrates an important portion of the spring controlling device illustrated in FIG. 14 in case that a breaker is closed.
Figure 16:
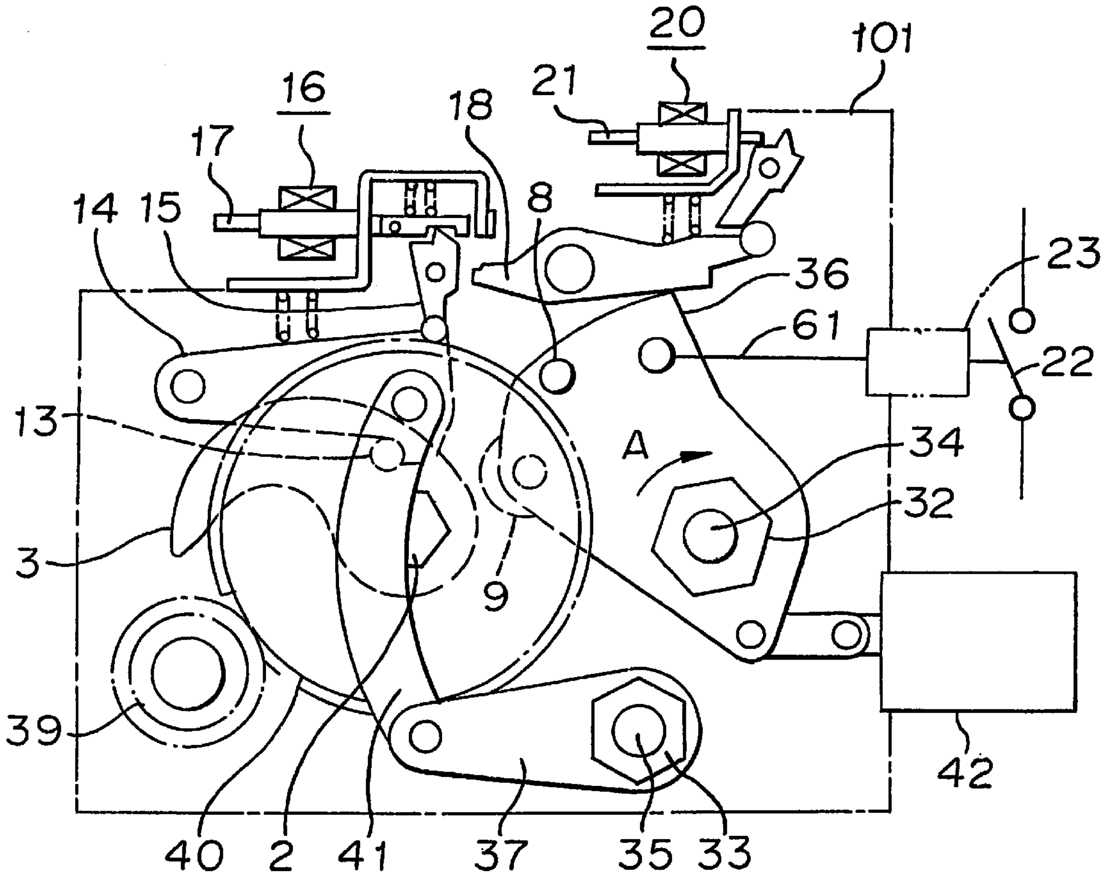
PRIOR ART FIG. 16
FIG. 16 illustrates a state of the spring controlling device illustrated in FIG. 14 in case that the breaker is opened.
Figure 17:
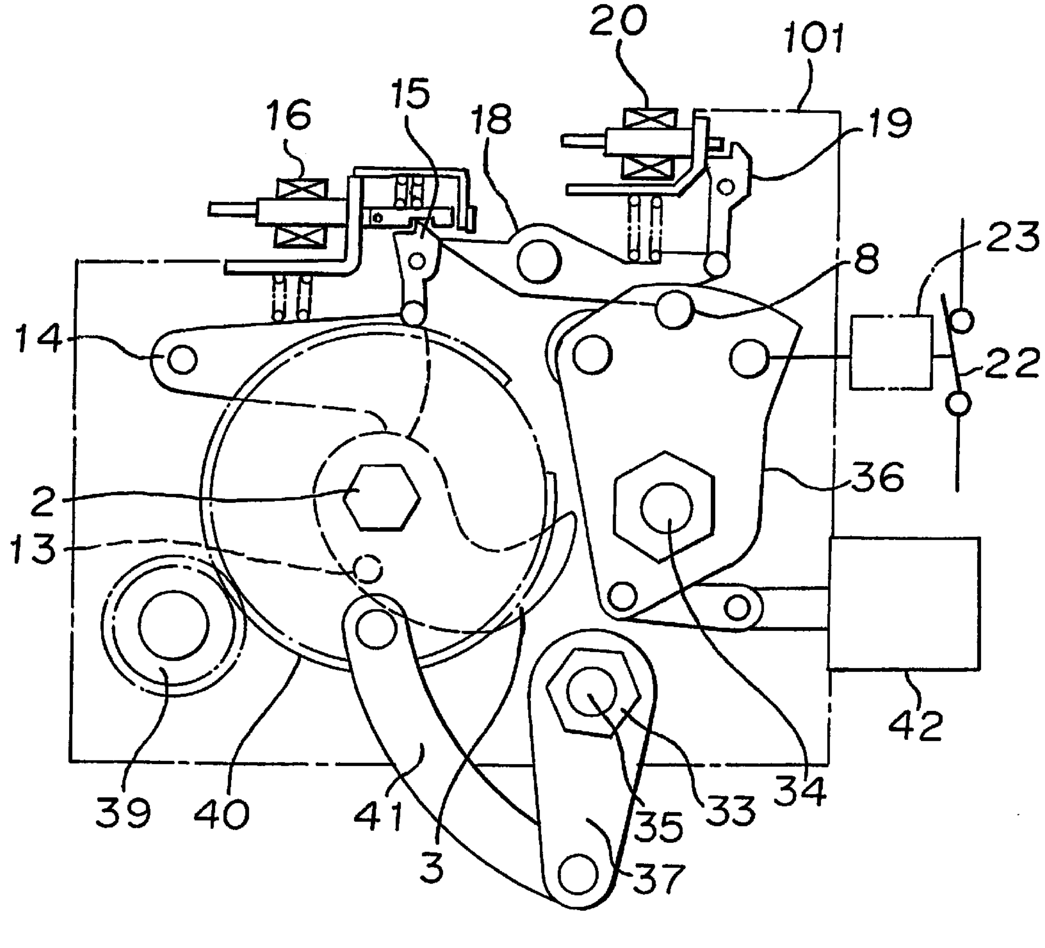
PRIOR ART FIG. 17
FIG. 17 illustrates a state of the spring controlling device illustrated in FIG. 14 in case that a torsion bar for closing a circuit is released.

FIGS. 9 through 13 illustrates another embodiment of the present invention, wherein FIG. 9 illustrates an important portion of a structure of a spring controlling device; FIG. 10 is a side view of the spring controlling device illustrated in FIG. 9, and FIG. 11 is a perspective view of the spring for controlling device in a state that a breaker is closed. FIG. 12 illustrates an important portion of a structure of the spring controlling device when the breaker is under an operation of opening a circuit. FIG. 13 is a graph of characteristics of a load of coil springs for opening and for aiding to open the circuit.

In these figures, numerical reference 59 designates the coil spring for opening the circuit; numerical reference 57 designates a rod for retaining the coil spring; and numerical reference 58 designates a buffer connected to the rod 57. The rod 57 is connected to a rod 61 via links and so on (not shown). The rod 61 moves in directions same as those of the rod 57 by interlocking this.

Figure 18:
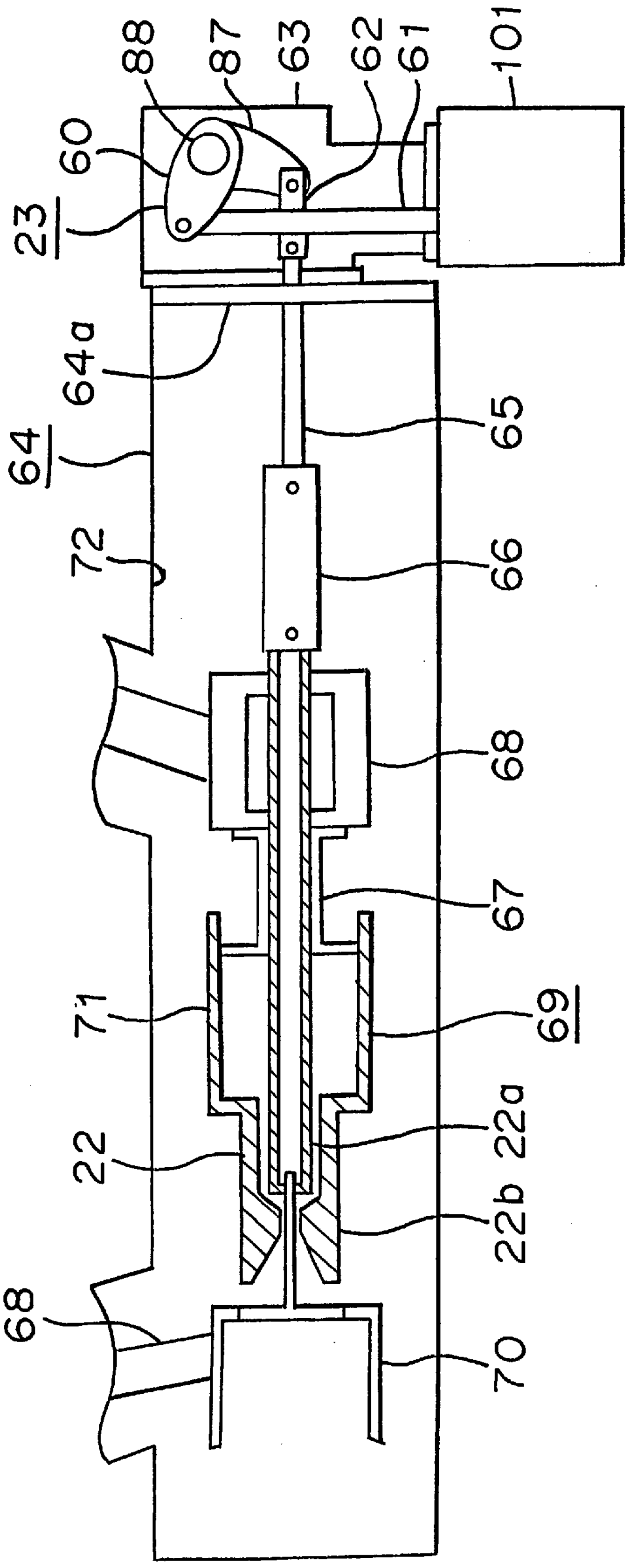
PRIOR ART FIG. 18
FIG. 18 is a front view of the conventional breaker.
Figure 19:
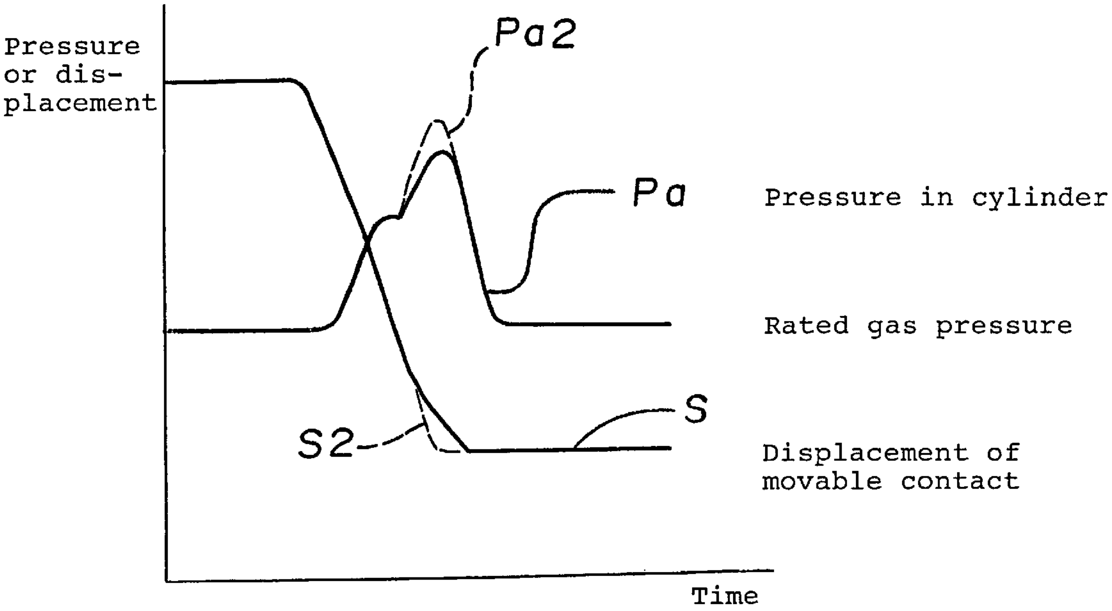
PRIOR ART FIG. 19
FIG. 19 is a graph showing a relationship between a displacement of a breaking control unit and a gas pressure in a cylinder in the conventional breaker.

A rotating shaft 88 is rotatably supported by a supporting plate 63, wherein a lever 60 is fixed to the rotating shaft 88 to rotate along therewith. The rod 61 is connected to the lever 60 by a pin as illustrated in FIG. 18. Numerical reference 73 designates a cam fixed to the rotating shaft 88 to rotate along with the rotating shaft 88. Numerical reference 74 designates a rod which has a loading plate 74*a* for pressing a coil spring 79 for aiding to open the circuit, which coil spring will be described in the latter part of this paragraph.

Numerical reference 75 designates a roller rotatably supported by the rod 74 and being in contact with the cam 73. Numerical reference 76 in FIG. 11 designates a pin protruded from the rod 74. Numerical reference 77 designates a latch. Numerical reference 78 designates a guide of the coil spring 79 for aiding to open the circuit, which limits the maximum length of the coil spring 79 in a released state.

In FIGS. 11 and 12, numerical reference 80 designates a roller; numerical reference 81 designates a rod end; numerical reference 82 in FIG. 12 designates a spring; and numerical reference 83 designates a rod end, in an end portion of which a holder 83*a* for accommodating the spring 82 and the rod end 81 are formed. The roller 80 is rotatably supported by the rod end 81. The coil spring 82 is accommodated in the holder 83*a* of the rod end 83, wherein the rod end 81 is slidably inserted in the holder 83*a* while compressing the coil spring 82. The rod end 83 is fixed to the rod 61.

In FIG. 11, the spring controlling device is in a state that the breaker is closed, wherein the coil spring 79 for aiding to open the circuit is prestressed. The coil spring 79 is prestressed by engaging the latch 77 with the pin 76 by rightward pressing the latch 77 in FIG. 11 by the roller 80 to rotate the latch 77 in the clockwise direction and keeping the coil spring 79 for aiding to open the circuit to have a compressed predetermined length using the loading plate 74*a* by pressing the latch 77 through the spring 82 and the roller 80. Even though the rod 61 slants, the device is constructed so that the latch 77 and the pin 76 are not disengaged by absorbing such a slant of the rod 61 using contraction and expansion of the spring 82.

In FIGS. 9 and 10, a cam 3 for closing the circuit, a cam 92 for aiding to close the circuit and a gear 40 are attached to a cam shaft 2. A roller 89 for transmitting a force of a coil spring 91 for aiding to close the circuit is in contact with the cam 92 for aiding to close the circuit through a spring retainer 90. A coil spring 94 for closing the circuit in FIG. 10 transmits its spring force to the gear through a rod 93 connected to the gear 40.

Further, a lever 95 having a roller 9 is connected to the rod 61 by a pin, wherein the roller 9 rotates with center at a supporting shaft 96 when the rod 61 upward and downward moves in FIG. 9.

In FIGS. 9 and 10, coil springs 94, 91 for closing the circuit and for aiding to close the circuit and coil springs 59, 71 for closing the circuit and for aiding to close the circuit are in a prestressed state.

In the next, an operation will be described. At first, an operation of opening a make break contact will be described.

When a command of opening the circuit is received, a latch mechanism (not shown) is released to start to release the coil spring 59 for opening the circuit and the rod 57 is moved in a downward direction. At this time, the rod 57 and the rod 61 interlocked with the rod 57 move in the downward direction from a state illustrated in FIG. 11, whereby the lever 60 rotates in the counterclockwise direction in FIG. 11. The cam 73 fixed to the rotating shaft 88 also rotates in the counterclockwise direction.

In an operation of opening the circuit, the rod end 83 attached to the rod 61 downward moves, and the roller 80 supported by the rod end 83 moves in the downward direction in FIG. 11 while rolling on a back surface of the latch 77. When the roller 80 is separated from the latch 77, the pin 76 is disengaged from the latch 77, and the rod 74 moves in the upward direction in FIG. 11 by a releasing force of the coil spring 79 for aiding to open the circuit. At this time, the roller 75 supported by the rod 74 is in contact with the cam 73 and presses this to apply a torque of rotating the lever 60 in the counterclockwise direction via the rotating shaft 88.

Characteristics of the spring are shown in FIG. 13. A spring force as a releasing force in the operation of opening the circuit is generated by only the coil spring 59 for opening the circuit in an initial stage of opening the circuit, which spring force is represented by a line g. In a middle of opening the circuit, the pin 76 and the latch 77 are disengaged to resultantly add a releasing force of the coil spring 79 for aiding to open the circuit as a line h after a point S1. The releasing forces by the coil springs 59, 79 for opening and for aiding to open the circuit become locally maximum at the point S1.

Just before completing to open the circuit, an operating rate of a mechanism such as rod 61 is decreased by a function of the buffer 58. When the operation of opening the circuit is completed, the loading plate 74*a* of the rod 74 is in contact with the guide 78 for guiding the coil spring 79 for aiding to open the circuit to restrict a released position of the coil spring 79 for aiding to open the circuit. The length of the coil spring 59 for opening the circuit is also restricted by a coil spring loading portion (not shown).

In the next, an operation of closing the circuit will be described. As illustrated in FIGS. 9 and 10, the coil springs 94, 91 for closing the circuit and for aiding to close the circuit are in a prestressed state by a prestressing device (not shown). The operation of closing the circuit starts from this state. At first, when a command of closing the circuit is received, a latch of a latch mechanism (not shown) is released, the force of the coil spring 94 is applied to the cam shaft 2 through the rod 93 in FIG. 10 and the gear 40, whereby the cam shaft clockwise rotate in FIG. 9.

Simultaneously, the spring force of the coil spring 91 for aiding to close the circuit is applied to the cam 92 through the spring retainer and the roller 89, the spring force works as an ancillary force for clockwise rotate the cam shaft 2 in FIG. 9. The cam shaft 2 clockwise rotates for clockwise turning the lever 95 through the roller 9. The rod 61 connected to the lever 95 is upward driven in FIG. 9.

When the rod 61 upward moves, the coil spring 59 for opening the circuit is compressed and prestressed and the lever 60 is clockwise rotated in FIG. 11. Further, the cam 73 is clockwise rotated. At this time, the roller 75 is downward pushed by the cam 73 from an initial stage to a middle of the operation of closing the circuit in FIG. 11, whereby the coil spring 79 for aiding to open the circuit is compressed and prestressed. The prestressing force is retained by engaging the pin 76 with the latch 77, whereby prestressing of the coil spring 79 for aiding to open the circuit is completed.

Further, after completing to prestress the coil spring 59 for opening the circuit, the latch mechanism (not shown) retains the coil spring 59, whereby the operation of closing the circuit is completed. During the operation of closing the circuit, the roller 89 is constantly in contact with the cam 92.

After the completion of the operation of closing the circuit, the coil springs 94, 81 for closing the circuit and for aiding to close the circuit are in a released state. Thereafter, in a similar manner to that described in Embodiment 1, the gear 40 is rotated by a prestressing mechanism (not shown) for prestressing the coil springs 94, 81 to realize the state illustrated in FIG. 9 in order to prepare for next making.

As described, in use of the coil spring for aiding to open the circuit, an energy necessary for closing the circuit is shared by the coil spring for opening the circuit and the coil spring for closing the circuit, whereby it is possible to suppress the sizes of the coil springs and the coil spring control device is miniaturized. Further, in use of the coil spring for aiding to close the circuit, an energy necessary for the operation of closing the circuit is shared by the coil spring for closing the circuit and the coil spring for aiding to close the circuit, whereby it is possible to suppress the sizes of the coil springs and the coil spring control device is miniaturized.

Further, because the coil spring 59 for opening the circuit and the coil spring 79 for aiding to open the circuit are used; the latch 77 for releasing the coil spring 79 for aiding to open the circuit is provided to release this in a middle of the operation of opening the circuit; and a releasing force of the coil spring 79 for aiding to open the circuit is added to the rotational force of the lever 60 through the roller 75 and the cam 73, it is possible to control the releasing force of the spring at time of opening the circuit and a capability of shutting out is improved by controlling a flow rate of a gas for extinguishing arcs.

Incidentally, only one of the torsion bars for aiding to open the circuit and for aiding to close the circuit may be provided in the above embodiment. Further, although in Embodiment 1 illustrated in FIGS. 1 and 2, the levers 26, 27, 55, 56 are located respectively between the torsion bars 28, 34 for opening the circuit, between the torsion bars 29, 35 for closing the circuit, between the torsion bars 51, 54 for aiding to open the circuit, and between the torsion bars 47, 53 for aiding to close the circuit so as to turn back in a paired state in order to shorten the length of the cylinder 24, the levers 26, 27, 55, 56 may be omitted to form the torsion bars by a single bar, or the torsion bars for opening the circuit and for closing the circuit, which are major torsion bars, may be formed by a pair of bars and the torsion bars for aiding to open the circuit and for aiding to close the circuit may be formed by a single bar.

Also, the coil springs may be similarly modified, in other words, only one of the coil springs for aiding to open the circuit and for aiding to close the circuit may be provided when necessary. For example, in a structure of prestressing the coil springs for open the circuit and for aiding to open the circuit by the coil springs for closing the circuit and for aiding to close the circuit, only the coil spring for closing the circuit is used without using the coil spring for aiding to close the circuit because requisite spring forces of the coil springs for open the circuit and for aiding to open the circuit are small in comparison with those of the coil springs for closing the circuit and for aiding to close the circuit.

Further, the elastic member is not limited to the above-mentioned torsion bar and coil spring and may be other elastic member such as an air spring and a rubber. Further, the switch may be an isolator or a load-break switch, by which an effect similar to that described in the above can be demonstrated.

The first advantage of the switch control device according to the present invention is that it is possible to prevent the sizes of the elastic members from being large in case that the releasing force is increased for a high output, therefore the size of the device can be suppressed.

The second advantage of the switch control device according to the present invention is that the releasing force is flexibly controlled and a characteristic of opening and closing the make break contact can be changed.

The third advantage of the switch control device according to the present invention is that the maximum load at time of prestressing is limited and the prestressing device can be miniaturized.

The fourth advantage of the switch control device according to the present invention is that the number of components is reduced in comparison with a case that the elastic members for opening the circuit and for aiding to open the circuit are separately prestressed; the structure is simplified; and the device becomes small at a low cost.

The fifth advantage of the switch control device according to the present invention is that it is not necessary to extremely reinforce the rigidity of the supporting members even when the releasing force of the torsion bar is increased, whereby the size of the device and an increment of the weight of the device can be suppressed.

The sixth advantage of the spring control device according to the present invention is that an initial releasing rate of the make break contact is made high and the electrically insulating gas is strongly brown by the cylinder, whereby a capability of shutting off is improved.

Obviously, numerous modifications and variations of the present invention are possible in light of the above teachings. It is therefore to be understood that within the scope of the appended claims, the invention may be practiced otherwise than as specifically described herein.

What is claimed is:

1. A switch control device comprising:

prestressing means, a make-break contact, and at least one of a device for closing a circuit and a device for opening the circuit, wherein said device for closing the circuit includes a first elastic member for closing the circuit, closing the make-break contact with a releasing force provided by said prestressing means, a second elastic member for aiding closing of the circuit and prestressed by said prestressing means consistent with prestressing of said first elastic member, and aiding the releasing force of said first elastic member consistent with releasing of said first elastic member, and a first cam for respectively prestressing and releasing said first elastic member, and prestressing and releasing said second elastic member, and said device for opening the circuit includes a third elastic member for opening the circuit, opening said make-break contact with a releasing force, a fourth elastic member for aiding opening of the circuit, aiding the releasing force of said third elastic member consistent with releasing of said third elastic member for opening the circuit, and a second cam for releasing said third elastic member, and releasing said fourth elastic member.

2. The switch control device according to claim 1, wherein said first cam applies a load to said prestressing means in a prestressing operation, prestressing said first and second elastic members, the load rising from a zero load on beginning the prestressing operation to a maximum load, remaining substantially constant at the maximum load during the prestressing operation, and decreasing from the maximum load to a zero load upon ending of the prestressing operation.

3. A switch control device comprising:

prestressing means, a make-break contact, and at least one of a device for closing a circuit and a device for opening the circuit, wherein said device for closing the circuit includes a first elastic member for closing the circuit, closing the make-break contact with a releasing force provided by said prestressing means, and a second elastic member for aiding closing of the circuit and prestressed by said prestressing means consistent with prestressing of said first elastic member, and aiding the releasing force of said first elastic member consistent with releasing of said first elastic member, and said device for opening the circuit includes a third elastic member for opening the circuit, opening said make-break contact with a releasing force, and a fourth elastic member for aiding opening of the circuit, aiding the releasing force of said third elastic member consistent with releasing of said third elastic member for opening the circuit, wherein said device for closing the circuit prestresses said third and forth elastic members with a releasing force of said first and second elastic members, said first, second, third, and fourth elastic members are torsion bars, said first and second elastic members are supported by a first common supporting member, and twisting directions of said first and second elastic members are opposite when prestressed, and said third and fourth elastic members are supported by a second common supporting member, and twisting directions of said third and fourth elastic members are opposite when prestressed.

4. The switch control device according to claim 3, including one of a gas-blast circuit-breaker and a load switch, wherein said make-break contact is located in an electrically insulating gas, the electrically insulating gas is blown onto said make-break contact by a cylinder actuated by the releasing force of said third and fourth elastic members upon opening of the circuit, and the releasing force generated by said third and fourth elastic members is maximum when starting to release and has a maximum value when blowing the electrically insulating gas in the device upon opening the circuit.

* * * * *